(12) United States Patent
Schmidt et al.

(10) Patent No.: US 9,829,604 B2
(45) Date of Patent: Nov. 28, 2017

(54) METHOD OF MAKING MULTILAYER OPTICAL FILM COMPRISING LAYER-BY-LAYER SELF-ASSEMBLED LAYERS AND ARTICLES

(71) Applicant: 3M INNOVATIVE PROPERTIES COMPANY, St. Paul, MN (US)

(72) Inventors: Daniel J. Schmidt, Woodbury, MN (US); James R. Miller, Hudson, WI (US); Timothy J. Hebrink, Scandia, MN (US); Mark B. O'Neill, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/435,186

(22) PCT Filed: Dec. 4, 2013

(86) PCT No.: PCT/US2013/073001
§ 371 (c)(1),
(2) Date: Apr. 13, 2015

(87) PCT Pub. No.: WO2014/099367
PCT Pub. Date: Jun. 26, 2014

(65) Prior Publication Data
US 2015/0285956 A1  Oct. 8, 2015

Related U.S. Application Data

(60) Provisional application No. 61/768,631, filed on Feb. 25, 2013, provisional application No. 61/740,165, filed on Dec. 20, 2012.

(51) Int. Cl.
*G02B 1/11* (2015.01)
*G02B 1/111* (2015.01)
(Continued)

(52) U.S. Cl.
CPC .............. *G02B 1/111* (2013.01); *G02B 1/005* (2013.01); *G02B 5/0816* (2013.01);
(Continued)

(58) Field of Classification Search
CPC ........ G02B 1/111; G02B 1/005; G02B 1/105; G02B 5/0816; G02B 5/0841; G02B 5/0891; G02B 5/287; G02B 5/3083; G09G 3/3406
(Continued)

(56) References Cited

U.S. PATENT DOCUMENTS 3,247,392 A   4/1966  Thelen
4,864,016 A   9/1989  DuPont
(Continued)

FOREIGN PATENT DOCUMENTS

CN    101464528 A    6/2009
EP    2393124        12/2011
(Continued)

OTHER PUBLICATIONS

"Ciba Tinuvin-R-796 Reactable UVAbsorber", Ciba Specialty Chemicals, 2001, 3pgs.
(Continued)

*Primary Examiner* — William R Alexander
(74) *Attorney, Agent, or Firm* — Clifton F. Richardson; Carolyn A. Fischer

(57) ABSTRACT

Methods of making a multilayer optical film are described. In one embodiment, the method comprises providing a multilayer optical film and disposing onto the multilayer optical film a plurality of layers deposited by layer-by-layer self-assembly of nanoparticles, polymers, and combinations thereof. The multilayer optical film typically comprises a plurality of alternating polymeric layers of a low refractive index layer and a high refractive index layer that reflects at
(Continued)

least one bandwidth of electromagnetic radiation ranging from ultraviolet to near infrared. Multilayer optical film articles are described comprising a plurality of layers disposed onto the multilayer optical film, wherein the plurality of layers comprises layer-by-layer self-assembled nanoparticles, polymers, and combinations thereof. The multilayer optical films are suitable for various uses including reflective polarizers for optical displays such as LCDs or LEDs, architectural film applications, window film applications, and solar power concentrating mirrors.

22 Claims, 6 Drawing Sheets

(51) Int. Cl.
G02B 1/00 (2006.01)
G02B 5/08 (2006.01)
G02B 5/28 (2006.01)
G02B 5/30 (2006.01)
G02B 1/14 (2015.01)
G02B 1/10 (2015.01)
G09G 3/34 (2006.01)

(52) U.S. Cl.
CPC ......... *G02B 5/0841* (2013.01); *G02B 5/0891* (2013.01); *G02B 5/287* (2013.01); *G02B 5/3083* (2013.01); *G02B 1/105* (2013.01); *G02B 1/14* (2015.01); *G09G 3/3406* (2013.01)

(58) Field of Classification Search
USPC ......... 359/256, 350, 489.01, 489.03, 489.06, 359/489.15, 489.16
See application file for complete search history.

(56) References Cited

U.S. PATENT DOCUMENTS

| | | | |
|---|---|---|---|
| 5,126,394 A | 6/1992 | Revis | |
| 5,540,978 A | 7/1996 | Schrenk | |
| 5,825,542 A * | 10/1998 | Cobb, Jr. | G02B 5/0841 |
| | | | 359/485.03 |
| 5,882,774 A | 3/1999 | Jonza | |
| 6,316,084 B1 | 11/2001 | Claus | |
| 6,352,761 B1 | 3/2002 | Hebrink | |
| 6,376,590 B2 | 4/2002 | Kolb | |
| 6,449,093 B2 | 9/2002 | Hebrink | |
| 6,783,349 B2 | 8/2004 | Neavin | |
| 6,827,886 B2 | 12/2004 | Neavin | |
| 6,953,607 B2 | 10/2005 | Cott | |
| 7,153,588 B2 | 12/2006 | McMan | |
| 7,258,924 B2 | 8/2007 | Cott | |
| 7,345,137 B2 | 3/2008 | Hebrink | |
| 7,940,447 B2 * | 5/2011 | Wu | B82Y 20/00 |
| | | | 359/265 |
| 8,234,998 B2 | 8/2012 | Krogman | |
| 8,277,899 B2 | 10/2012 | Krogman | |
| 8,313,798 B2 | 11/2012 | Nogueira | |
| 2003/0058383 A1 * | 3/2003 | Jagt | G02B 6/0038 |
| | | | 349/65 |
| 2004/0157047 A1 | 8/2004 | Mehrabi | |
| 2006/0084780 A1 | 4/2006 | Hebrink | |
| 2006/0148950 A1 | 7/2006 | Davidson | |
| 2006/0198025 A1 | 9/2006 | Chen | |
| 2006/0285210 A1 * | 12/2006 | Hebrink | B32B 27/08 |
| | | | 359/584 |
| 2009/0205536 A1 * | 8/2009 | Chiang | C09D 1/00 |
| | | | 106/286.5 |
| 2009/0283144 A1 | 11/2009 | Hebrink | |
| 2009/0316084 A1 * | 12/2009 | Yajima | B29C 47/0021 |
| | | | 349/96 |
| 2010/0003499 A1 | 1/2010 | Krogman | |
| 2010/0014366 A1 | 1/2010 | Nam | |
| 2010/0075136 A1 | 3/2010 | Song | |
| 2010/0290109 A1 | 11/2010 | Kurt | |
| 2011/0064936 A1 | 3/2011 | Hammond-Cunningham | |
| 2012/0011850 A1 | 1/2012 | Hebrink | |
| 2012/0148829 A1 | 6/2012 | Krogman | |
| 2015/0037567 A1 | 2/2015 | Clear | |

FOREIGN PATENT DOCUMENTS

| | | |
|---|---|---|
| WO | WO 99-35520 | 7/1999 |
| WO | WO 2007-053772 | 5/2007 |
| WO | WO 2009-140493 | 11/2009 |
| WO | WO 2010-059416 | 5/2010 |
| WO | WO 2010-075161 | 7/2010 |
| WO | WO 2010-078105 | 7/2010 |
| WO | WO 2010-078289 | 7/2010 |
| WO | WO 2011-026104 | 3/2011 |
| WO | WO 2011-062836 | 5/2011 |
| WO | WO 2012-015989 | 2/2012 |
| WO | WO 2012-112624 | 8/2012 |
| WO | WO 2013-142239 | 9/2013 |
| WO | WO 2014-099367 | 6/2014 |

OTHER PUBLICATIONS

Basarir, "Sonication-assisted layer-by-layer deposition of gold nanoparticles for highly conductive gold patterns", Ultrasonics Sonochemistry, 2012, vol. 19, No. 3, pp. 621-626.

Berg, "Self-assembled nanostructured multilayered spectral filters". Proceedings of SPIE, 2006, vol. 6172, pp. 61720W.1-61720W.5.

Bucatariu, "Single polyelectrolyte multilayers deposited onto silica microparticles and silicon wafers", Colloids and Surfaces A, 2011, vol. 380, pp. 111-118.

Cebeci, "Nanoporosity-Driven Superhydrophilicity: A Means to Create Multifunctional Antifogging Coatings", Langmuir, 2006, vol. 22. No. 6, pp. 2856-2862.

Cheng, "Preparation of the layer-by-layer deposited silver nanoparticles multilayer films on poly(ethylene Terephalate) substrate", Advanced Materials Research Vols., 2011, vol. 189-193, pp. 1362-1365.

Choi, "Multilayer Thin Films by Layer-by-Layer Assembly of Hole- and Electron-Transport Polyelectrolytes: Optical and Electrochemical Properties", Macromolecular Chemistry and Physics, 2006, pp. 1870-1879.

Dawidczyk, "Layer-by-Layer Assembly of UV-Resistant Poly(3,4-ethylenedioxythiophene) Thin Films", Langmuir, 2008. vol. 24, pp. 8314-8318.

Decher, "Fuzzy Nanoassemblies: Toward Layered Polymeric Multicomposites", Science, Aug. 29, 1997, vol. 277, pp. 1232-1237.

Eby, "Bacterial sunscreen: Layer-by-layer deposition of UV-absorbing polymers on whole-cell biosensors", Langmuir, 2012. vol. 28, pp. 10521-10527.

Eita, "Thin Films of Zinc Oxide Nanoparticles and Poly(acrylic acid) Fabricated by the Layer-by-Layer Technique: a Facile Platform for Outstanding Properties", Journal of Physical Chemistry C, 2012, vol. 116, pp. 4621-4627.

Fu, "Facile and Efficient Approach to Speed up Layer-by-Layer Assembly: Dipping in Agitated Solutions", Langmuir, 2010, vol. 27, No. 2, pp. 672-677.

Fujimoto, "Self-Assembled Nano-heterostructural Thin Film for Optical Lens", Japanese Journal of Applied Physics, 2011, vol. 50, pp. 045803.1-045803.5.

Fujimoto, "Fabrication of Layer-by-Layer Self-Assembly Films Using Roll-to-Roll Process", Japanese Journal of Applied Physics, 2005, vol. 44, No. 3, pp. L126-L128.

Iamphaojeen, "Immobilization of zinc oxide nanoparticles on cotton fabrics using poly 4-styrenesulfonic acid polyelectrolyte", International Journal of Materials Research, 2012. vol. 103, pp. 643-647.

Iler, "Multilayers of Colloidal Particles", Journal of Colloid and Interface Science, 1966. vol. 21, pp. 569-594.

Izquierdo, "Dipping versus Spraying: Exploring the Deposition Conditions for Speeding Up Layer-by-Layer Assembly", Langmuir, 2005, vol. 21, pp. 7558-7567.

(56) References Cited

OTHER PUBLICATIONS

Ji, "Stimuli-Free Auto-Modulated Material Release from Mesoporous Nanocompartment Films", Journal of the American Chemical Society, 2008, vol. 130, pp. 2376-2377.
Krogman, "Automated Process for Improved Uniformity and Versatility of Layer-by-Layer Deposition", Langmuir, 2007. vol. 23, pp. 3137-3141.
Kurt, "Structural color via layer-by-layer deposition: layered nanoparticle arrays with near-UV and visible reflectivity bands.", Journal of Materials Chemistry, 2009. vol. 19, No. 47, pp. 8920-8927.
Lehaf, Correlating the Compliance and Permeability of Photo-Cross-Linked Polyelectrolyte Multilayers, Langmuir, 2011, vol. 27, pp. 4756-4763.
Liu, "Calcium-doped ceria/titanate tabular functional nanocomposite by layer-by-layer coating method", Journal of Solid State Chemistry, 2010, vol. 183, pp. 1545-1549.
Liu, "Layer-by-layer self-assembly of $TiO_2$ sol on wool to improve its anti-ultraviolet and anti-ageing properties", Journal of Sol-Gel Science and Technology, 2012, vol. 62, pp. 338-343.
Lvov, "Converting Poorly Soluble Materials into Stable Aqueous Nanocolloids", Lanmguir, 2011, vol. 27, No. 3, pp. 1212-1217.
Niemiec, "Nanoheterogeneous Multilayer Films with Perfluorinated Domains Fabricated Using the Layer-by-Layer Method", Langmuir, 2010, vol. 26, No. 14, pp. 11915-11920.
Nogueira, "Spray-Layer-by-Layer Assembly Can More Rapidly Product Optical-Quality Multilayer Heterostructures", Langmuir, 2011, vol. 27, pp. 7860-7867.
Park, "pH-Sensitive Bipolar Ion-Permselective Ultrathin Films", Journal of American Chemical Society, 2004, vol. 126, pp. 13723-13731.
Park, "Sustained Release Control via Photo-Cross-Linking of Polyelectrolyte Layer-by-Layer Hollow Capsules", Langmuir, 2005, vol. 21, pp. 5272-5277.
Schaaf, "Spray-Assisted Polyelectrolyte Multilayer Buildup: from Step-by-Step to Single-Step Polyelectrolyte Film Constructions", Advanced Materials, 2012, vol. 24, pp. 1001-1016.
Schlenoff, "Sprayed Polyelectrolyte Multilayers", Langmuir, 2000. vol. 16, pp. 9968-9969.
Svehla, "Polyester Preparation in the Presence of Pristine and Phosphonic-Acid-Modified Zirconia Nanopowders", Macromolecules Materials and Engineering, 2012, vol. 297, pp. 219-227.
Ugur, "Modifying of cotton fabric surface with Nano-ZnO multilayer films by Layer-by-Layer deposition method", Nanoscale Research Letters, 2010, vol. 5, pp. 1204-1210.
Ugur, "Nano-$TiO_2$ based multilayer film deposition on cotton fabrics for UV-protection" Fibers and Polymers, 2011. vol. 12, No. 2, pp. 190-196.
Van-Cott, "Characterization of the purity and stability of commercially available dichlorotriazine chromophores used in nonlinear optical materials", Dyes and Pigmments, 2003, vol. 58, pp. 145-155.
Volodkin, "Matrix Polyelectrolyte Microcapsules: New System for Macromolecule Encapsulation", Langmuir, 2004, vol. 20, pp. 3398-3406.
Wang, "Developing a novel UV protection process for cotton based on layer-by-layer self-assembly", Carbohydrate Polymers, 2010, vol. 81, pp. 491-496.
Wang, "Transparent nanostructured coatings with UV-shielding and superhydrophobicity properties", Nanotechnology, 2011, vol. 22, 265708, 7pgs.
Wu, "Structural Color in Porous, Superhydrophilic, and Self-Cleaning $SiO_2/TiO_2$ Bragg Stacks", Small, 2007, vol. 3, No. 8, 1445-1451.
Yi, "UV-Cross-Linkable Multilayer Microcapsules Made of Weak Polyelectrolytes", Langmuir, 2012, vol. 28, pp. 10822-10829.
International Search Report for PCT International Application No. PCT/US2013/073001, dated Feb. 24, 2014, 5pgs.
CN Search Report 2013800669194 dated Feb. 4, 2016, 2 pages.

\* cited by examiner

METHOD OF MAKING MULTILAYER OPTICAL FILM COMPRISING LAYER-BY-LAYER SELF-ASSEMBLED LAYERS AND ARTICLES

CROSS REFERENCE TO RELATED APPLICATIONS

This application is a national stage filing under 35 U.S.C. 371 of PCT/US2013/073001, filed Dec. 4, 2013, which claims priority to U.S. Provisional Application Nos. 61/768,631, filed Feb. 25, 2013 and 61/740,165, filed Dec. 20, 2012, the disclosure of which is incorporated by reference in their entirety herein.

SUMMARY

In one embodiment, a method of making a multilayer optical film is described. The method comprises providing a multilayer optical film and disposing onto the multilayer optical film a plurality of layers deposited by layer-by-layer self-assembly of nanoparticles, polymers, and combinations thereof. The multilayer optical film typically comprises a plurality of alternating polymeric layers of a low refractive index layer and a high refractive index layer that reflects at least one bandwidth of electromagnetic radiation ranging from ultraviolet to near infrared.

In some favored embodiments, the plurality of layers deposited by layer-by-layer self-assembly comprises alternating stacks of low refractive index bi-layers and high refractive index bi-layers wherein the stacks complement the reflection properties of the multilayer optical film by increasing the reflectivity at the same or a different bandwidth of electromagnetic radiation.

In other embodiments, the plurality of low refractive index bi-layers and high refractive index bi-layers deposited by layer-by-layer self-assembly reduces the surface reflections at 550 nm of the multilayer optical film, or in other words, provides an antireflective coating.

In yet other embodiments, the plurality of layers deposited by layer-by-layer self-assembly provides a protective top coat, such as can be achieved by the plurality of deposited layers having about the same refractive index, such as a plurality of silica layers.

In yet other embodiments, multilayer optical film articles are described comprising a multilayer optical film and a plurality of layers disposed onto the multilayer optical film, wherein the plurality of layers comprises layer-by-layer self-assembled nanoparticles, polymers, and combinations thereof.

The multilayer optical films are suitable for various uses including reflective polarizers for optical displays such as LCDs or LEDs, architectural film applications, window film applications, and solar power concentrating mirrors.

DETAILED DESCRIPTION

Figure 1:
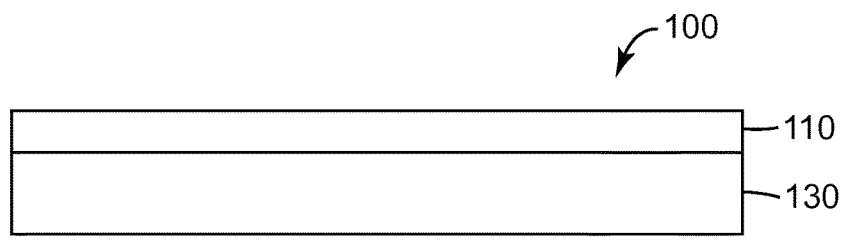
FIG. 1 is a cross sectional view of an illustrative article 100 comprising a multilayer optical film 130 and a plurality of layers deposited by layer-by-layer self-assembly 110, disposed on multilayer optical film 130.

As used in this application:

"index of refraction", also referred to as "index" or "RI", refers to a refractive index of a material in the plane of the material with respect to light at 633 nm and normal or near normal (i.e. 8 degrees) incidence, unless otherwise indicated;

"high refractive index" and "low refractive index" are relative terms; when two layers are compared in both in-plane directions of interest, the layer that has a greater average in-plane refractive index is the high refractive index layer, and the layer that has a lower average in-plane refractive index is the low refractive index layer;

"birefringent" means that the indices of refraction in orthogonal x, y, and z directions are not all the same. Index of refraction is designated as $n_x$, $n_y$, and $n_z$ for x, y, and z directions, respectively. For the polymer layers described herein, the axes are selected so that x and y axes are in the plane of the layer and the z axis is normal to the plane of the layer and typically corresponds to the thickness or height of the layer. Where a refractive index in one in-plane direction is larger than a refractive index in another in-plane direction, the x-axis is generally chosen to be the in-plane direction with the largest index of refraction, which sometimes corresponds to one of the directions in which the optical film is oriented (e.g., stretched). Birefringence values are expressed herein with respect to light at 633 nm and normal incidence, unless otherwise indicated;

"in-plane birefringence, $\Delta n_{in}$," of a uniaxially stretched film concerns the difference of the indices ($n_x$ and $n_y$) in the orthogonal in-plane directions. More specifically for a uniaxially stretched film, in-plane birefringence refers to the difference between the stretching direction and the non-stretching direction. For example, assuming a film is uniaxially stretched in the machine direction (MD), the in-plane birefringence is expressed as the following.

$$\Delta n_{in} = n_x - n_y$$

Where $n_x$ is the refractive index in the stretching direction (in this case, MD), and $n_y$ is the refractive index in the non-stretching direction (in this case, transverse direction (TD)). For a biaxially stretched film, the in-plane birefringence is relatively small and sometimes close to zero if balanced. Instead, out-of-plane birefringence is more indicative of the birefringent nature of the stretched film;

"out-of-plane birefringence, $\Delta n_{out}$" of a biaxially oriented film, concerns the difference between average of in-plane indices ($n_x$ and $n_y$) and the index normal to the film ($n_z$). Out-of-plane birefringence can be expressed as the following:

$$\Delta n_{out} = \frac{(n_x + n_y)}{2} - n_z$$

where $n_x$ is RI in MD and $n_y$ is RI in TD and $n_z$ is RI normal to the film. Out-of-plane birefringence can also be used to measure the birefringent nature of uniaxially stretched films;

"polymer" with respect to the polymeric materials of the multilayer optical films (unless specified otherwise) means polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included;

"polyelectrolyte" means a polymer with multiple ionic groups capable of electrostatic interaction. "Strong polyelectrolytes" possess permanent charges across a wide range of pH (e.g., polymers containing quaternary ammonium groups or sulfonic acid groups). "Weak polyelectrolytes" possess a pH-dependent level of charge (e.g. polymers containing primary, secondary, or tertiary amines, or carboxylic acids);

"reflectivity" was measured at normal incidence which is understood to include slight deviations from 90 degrees (e.g. 8 degree deviation).

Unless specified otherwise, a bandwidth refers to any increment of at least 10 nm of electromagnetic radiation between 290 nm and 1100 nm. A bandwidth may also be greater than 10 nm such as 25 nm, 50 nm, or 100 nm. As used herein, visible light refers to the bandwidth from 400 nm to 700 nm; ultraviolet refers to the bandwidth 290 to 400 nm; UV-blue is the bandwidth from 350 to 490 nm; and near infrared refers to the bandwidth from 870 to 1100 nm.

With respect to FIG. 1, the present invention concerns multilayer optical film (MOF) articles and methods of making such wherein a plurality of layers 110 deposited by layer-by-layer self-assembly is disposed on multilayer optical film 130. In some embodiments, the plurality of layers 110 deposited by layer-by-layer self-assembly forms a major surface layer that is exposed to the environment. Although FIG. 1 depicts the plurality of layers deposited by layer-by-layer self-assembly on a single major surface, in another embodiment both major surfaces of multilayer optical film 130 can comprise a plurality of layers 110 deposited by layer-by-layer self-assembly.

Multilayer optical films include a film having two or more layers. Multilayer optical films are useful, for example, as highly efficient mirrors and/or polarizers.

Various multilayer optical films are known. Multilayer optical films generally comprise alternating polymeric layers of at least one birefringent polymer (e.g. oriented semi-crystalline polymer) and one second polymer, the layers selected to achieve the reflection of a specific bandwidth of electromagnetic radiation.

Figure 1A:
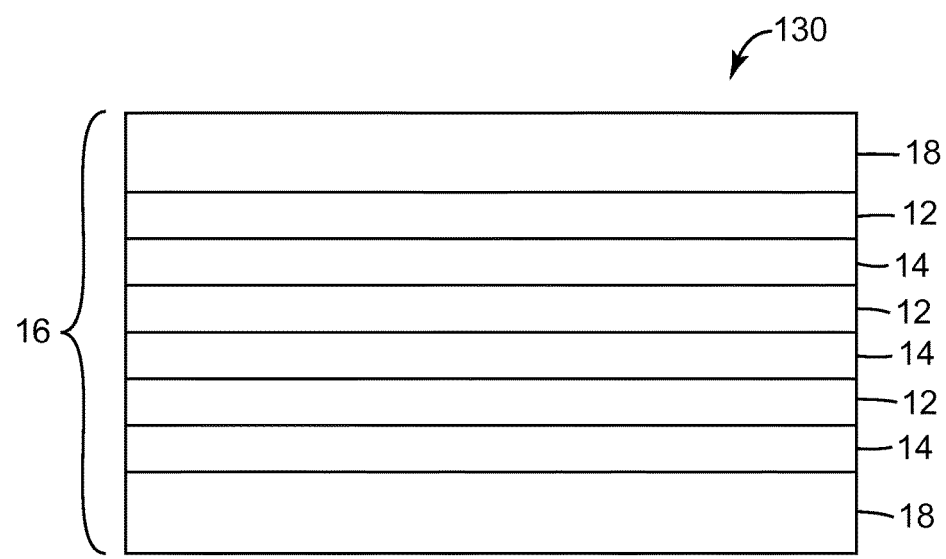
FIG. 1A is a cross sectional view of multilayer optical film 130.

FIG. 1A shows a multilayer polymer film 130 that may be used, for example, as an optical polarizer or mirror. The film 16 includes one or more first optical layers 12, one or more second optical layers 14, and optionally one or more (e.g. non-optical) additional layers 18. FIG. 1A includes a multilayer stack having alternating layers 12, 14 of at least two materials. In one embodiment, the materials of layers 12 and 14 are polymeric. An in-plane index of refraction $n_1$ in one in-plane direction of high refractive index layer 12 is higher than the in-plane index of refraction $n_2$ of low refractive index layer 14 in the same in-plane direction. The difference in refractive index at each boundary between layers 12, 14 causes part of the incident light to be reflected. The transmission and reflection characteristics of multilayer film 16 is based on coherent interference of light caused by the refractive index difference between layers 12, 14 and the thicknesses of layers 12, 14. When the effective indices of refraction (or in-plane indices of refraction for normal incidence) differ between layers 12, 14, the interface between adjacent layers 12, 14 forms a reflecting surface. The reflective power of the reflecting surface depends on the square of the difference between the effective indices of refraction of the layers 12, 14 (e.g., $(n_1-n_2)^2$). By increasing the difference in the indices of refraction between the layers 12, 14, improved optical power (higher reflectivity), thinner films (thinner or fewer layers), and broader bandwidth performance can be achieved. The refractive index difference in one in-plane direction in an exemplary embodiment is at least about 0.05, preferably greater than about 0.10, more preferably greater than about 0.15 and even more preferably greater than about 0.20.

In one embodiment, the materials of layers 12, 14 inherently have differing indices of refraction.

In another embodiment, at least one of the materials of the layers 12, 14 has the property of stress induced birefringence, such that the index of refraction (n) of the material is affected by the stretching process. By stretching multilayer film 16 over a range of uniaxial to biaxial orientations, films can be created with a range of reflectivities for differently oriented plane polarized incident light.

The number of layers is typically at least 10, 25, 50 or 100. In favored embodiments, the number of layers in multilayer film 16 is selected to achieve the desired optical properties using the minimum number of layers for reasons of film thickness, flexibility and economy. In the case of reflective films such as polarizers and mirrors, the number of layers is preferably less than about 2,000, more preferably less than about 1,000, and even more preferably less than about 750. In some embodiments, the number of layer is at least 150 or 200. In other embodiments, the number of layer is at least 250.

In some embodiments, the multilayer polymer film further comprises optional additional non-optical or optical layers. The additional layers 18 are polymer layers that are disposed within the film 16. Such additional layers may protect the optical layers 12, 14 from damage, aid in the co-extrusion processing, and/or to enhance post-processing mechanical properties. The additional layers 18 are often thicker than the optical layers 12, 14. The thickness of the additional (e.g. skin) layers 18 is usually at least two times, preferably at least four times, and more preferably at least ten times, the thickness of the individual optical layers 12, 14. The thickness of the additional layers 18 may be varied to make a multilayer polymer film 16 having a particular thickness. A tie layer (not shown) may be present between the non-optical skin layer and the optical layers. Further, a top coat (also not shown) may be disposed upon the skin layer. Typically, one or more of the additional layers 18 are placed so that at least a portion of the light to be transmitted, polarized, and/or reflected by the optical layers 12, 14, also travels through the additional layers (i.e., the additional layers are placed in the path of light which travels through or is reflected by the optical layers 12, 14).

One embodiment of multilayer film 16 comprises multiple low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers 12, 14 in the multilayer stack having an average thickness of not more than about 0.5 micrometers. In other exemplary embodiments, different low/high index pairs of layers may have different combined optical thicknesses, such as where a broadband reflective optical film is desired.

Asymmetric reflective films (such as films resulting from unbalanced biaxial stretching) may be desirable for certain applications. In that case, average transmission along one stretch direction may be desirably less than, for example, about 50 percent, while the average transmission along the other stretch direction may be desirably less than, for example, about 20 percent, over a bandwidth of, for example, the visible spectrum (about 380-750 nm), or over the visible spectrum and into the near infrared (e.g., about 380-850 nm).

Multilayer optical films can also be designed to operate as reflective polarizers. One way to produce a multilayer reflective polarizer is to uniaxially stretch a multilayer stack. The resulting reflective polarizers have high reflectivity for light with its plane of polarization parallel to a first in-plane axis (usually, in the stretch direction) for a broad range of angles of incidence, and simultaneously have low reflectivity and high transmissivity for light with its plane of polarization parallel to a second in-plane axis that is orthogonal to the first in-plane axis (usually, in the non-stretch direction) for a broad range of angles of incidence. By controlling the three indices of refraction of each film, $n_x$, $n_y$ and $n_z$, the desired polarizer behavior can be obtained. See, for example, U.S. Pat. No. 5,882,774 (Jonza et al.).

The first optical layer(s) are prepared from a birefringent polymer having an in-plane birefringence (the absolute value of $n_x - n_y$) after orientation of at least 0.10 and preferably at least 0.15. In some embodiments the birefringence of the first optical layer is 0.20 or greater. The refractive index of the polyester for 632.8 nm light polarized in a plane parallel to the stretch direction can increase from about 1.62 to as high as about 1.87. For other types of multilayer optical films, such as those utilized as a mirror film, the out-of-plane birefringence properties are of importance. In some embodiments, the average out-of-plane birefringence is at least 0.10, at least 0.15 or at least 0.20.

The optical layers 12, 14 and the optional additional layers 18 of the multilayer polymer film 16 are typically composed of polymers such as polyesters. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The properties of a polymer layer or film vary with the particular choice of monomer molecules of the polyester.

Suitable carboxylate monomer molecules for use in forming the carboxylate subunits of the polyester layers include, for example, 2,6-naphthalene dicarboxylic acid and isomers thereof, terephthalic acid; isophthalic acid; phthalic acid; azelaic acid; adipic acid; sebacic acid; norbornene dicarboxylic acid; bi-cyclo-octane dicarboxylic acid; 1,4-cyclohexane dicarboxylic acid and isomers thereof, t-butyl isophthalic acid, trimellitic acid, sodium sulfonated isophthalic acid; 4,4'-biphenyl dicarboxylic acid and isomers thereof, and lower alkyl esters of these acids, such as methyl or ethyl esters. The term "lower alkyl" refers, in this context, to C1-C10 straight-chained or branched alkyl groups.

Suitable glycol monomer molecules for use in forming glycol subunits of the polyester layers include ethylene glycol; propylene glycol; 1,4-butanediol and isomers thereof, 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof, bisphenol A; 1,8-dihydroxy biphenyl and isomers thereof, and 1,3-bis (2-hydroxyethoxy)benzene.

An exemplary polymer useful as the birefringent layer in the multilayer optical films of the present invention is polyethylene naphthalate (PEN), which can be made, for example, by reaction of naphthalene dicarboxylic acid with ethylene glycol. Polyethylene 2,6-naphthalate (PEN) is frequently chosen as a birefringent polymer. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed. Copolymers of PEN (CoPEN), such as those described in U.S. Pat. No. 6,352,761 (Hebrink et al.) and U.S. Pat. No. 6,449,093 (Hebrink et al.) are particularly useful for their low temperature processing capability making them more coextrusion compatible with less thermally stable second polymers. Other semicrystalline polyesters suitable as birefringent polymers include, for example, polybutylene 2,6-naphthalate (PBN), polyethylene terephthalate (PET), and copolymers thereof such as those described in U.S. Pat. No. 6,449,093 B2 (Hebrink et al.) or U.S. Pat. App. No. 2006/0084780 (Hebrink et al.), both herein incorporated by reference in their entirety. Alternatively, syndiotactic polystyrene (sPS) is another useful birefringent polymer.

The second polymer of the multilayer optical film can be made from a variety of polymers having glass transition temperatures compatible with that of the first birefringent polymer and having a refractive index similar to the isotropic refractive index of the birefringent polymer. Examples of other polymers suitable for use in optical films and, particularly, in the second polymer include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second polymer can be formed from homopolymers and copolymers of polyesters, polycarbonates, fluoropolymers, and polydimethylsiloxanes, and blends thereof.

Other exemplary suitable polymers, especially for use as the second polymer, include homopolymers of polymethylmethacrylate (PMMA), such as those available from Ineos Acrylics, Inc., Wilmington, Del., under the trade designations CP71 and CP80, or polyethyl methacrylate (PEMA), which has a lower glass transition temperature than PMMA. Additional second polymers include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation Perspex CP63), a coPMMA formed with MMA comonomer units and n-butyl methacrylate (nBMA) comonomer units, or a blend of PMMA and poly(vinylidene fluoride) (PVDF).

Yet other suitable polymers, especially useful as the second polymer, include polyolefin copolymers such as poly (ethylene-co-octene) (PE-PO) available from Dupont Performance Elastomers under the trade designation Engage 8200, poly (propylene-co-ethylene) (PPPE) available from Fina Oil and Chemical Co., Dallas, Tex., under the trade designation Z9470, and a copolymer of atactic polypropylene (aPP) and isotactic polypropylene (iPP). The multilayer optical films can also include, for example in the second polymer layers, a functionalized polyolefin, such as linear low density polyethylene-g-maleic anhydride (LLDPE-g-MA) such as that available from E.I. duPont de Nemours & Co., Inc., Wilmington, Del., under the trade designation Bynel 4105.

Preferred polymer compositions suitable as the second polymer in alternating layers with the at least one birefringent polymer include PMMA, CoPMMA, polydimethyl siloxane oxamide based segmented copolymer (SPDX), fluoropolymers including homopolymers such as PVDF and copolymers such as those derived from tetrafluoroethylene, hexafluoropropylene, and vinylidene fluoride (THV), blends of PVDF/PMMA, acrylate copolymers, styrene, styrene copolymers, silicone copolymers, polycarbonate, polycarbonate copolymers, polycarbonate blends, blends of polycarbonate and styrene maleic anhydride, and cyclic-olefin copolymers.

The selection of the polymer compositions used in creating the multilayer optical film will depend upon the desired bandwidth to be reflected. Higher refractive index differences between the birefringent polymer and the second polymer create more optical power thus enabling more reflective bandwidth. Alternatively, additional layers may be employed to provide more optical power. Preferred combinations of birefringent layers and second polymer layers may include, for example, the following: PET/THV, PET/SPDX, PEN/THV, PEN/SPDX, PEN/PMMA, PET/CoPMMA, PEN/CoPMMA, CoPEN/PMMA, CoPEN/SPDX, sPS/SPDX, sPS/THV, CoPEN/THV, PET/fluoroelastomers, sPS/fluoroelastomers and CoPEN/fluoroelastomers. PEN/coPEN and coPEN/coPEN combinations are also known from WO 2010/059416 (Liu et al.).

An optional tie layer may be interposed between the multilayer optical film stack 16 and non-optical (e.g. skin layer) 18 to assist in the adherence of the films and provide long term stability while the article of the present invention is exposed to outdoor elements. Non-limiting examples of tie layers include: SPDX, and CoPETs including modifications with functional groups such as sulfonic acids, PMMA/ PVDF blends, modified olefins with functional comonomers such as maleic anhydride, acrylic acid, methacrylic acid or vinyl acetate. Additionally, UV or thermally curable acrylates, silicones, epoxies, siloxanes, and urethane acrylates may be suitable as tie layers. The tie-layers may optionally contain UV absorbers as described above. The tie layers may optionally contain conventional plasticizers, tackifiers, or combinations thereof. The tie layer may be applied utilizing conventional film forming techniques.

The multilayer optical film may optionally include a (e.g. durable) protective top coat to assist in preventing its premature degradation due to exposure to outdoor elements, as described in the art.

In some embodiments, the plurality of layers deposited by layer-by-layer self-assembly provides sufficient solar and preferably mechanical protection to the multilayer optical film. In such an embodiment, the multilayer optical film article lacks a protective layer between the multilayer optical film and plurality of layers deposited by layer-by-layer self assembly.

For embodiments wherein the multilayer optical film comprises such a top coat, it is appreciated that the layer that was formerly the "top coat" of the multilayer optical film becomes an intermediate layer after the plurality of self-assembled layers are disposed upon the multilayer optical film. Such a top coat may be characterized as a protective layer between the multilayer optical film and plurality of layer deposited by layer-by-layer self assembly.

The (e.g. durable) protective topcoat, also referred to as a hardcoat, can be abrasion and impact resistant and does not interfere with the primary function of reflecting a selected bandwidth of electromagnetic radiation. Top coat layers may include one or more of the following non-limiting examples, PMMA/PVDF blends, thermoplastic polyurethanes, curable polyurethanes, CoPET, cyclic olefin copolymers (COC's), fluoropolymers and their copolymers such as PVDF, ETFE, FEP, and THV, thermoplastic and curable acrylates, cross-linked acrylates, cross-linked urethane acrylates, cross-linked urethanes, curable or cross-linked polyepoxides, and SPDX. Strippable polypropylene copolymer skins may also be employed. Alternatively, silane silica sol copolymer hard coating can be applied as a durable top coat to improve scratch resistance.

The thickness of the top coat is dependent upon an optical density target at specific wavelengths as calculated by Beer's Law. In some embodiments, the top coat has an optical density greater than 3.5 at 380 nm; greater than 1.7 at 390; and greater than 0.5 at 400 nm.

The multilayer optical film and/or the non-optical skin layer and/or the top coat can comprise various additives such as UV absorbers (UVA), hindered amine light stabilizers (HALS), antioxidants, and combinations thereof.

UV stabilizers such as UV absorbers are chemical compounds which can intervene in the physical and chemical processes of photo-induced degradation. The photooxidation of polymers from UV radiation can therefore be prevented by use of a protective layer containing UV absorbers to effectively block UV light. For the purpose of the present invention, UV stabilizers suitable as light stabilizers are red shifted UV absorbers (RUVA) which absorb at least 70%, preferably 80%, particularly preferably greater than 90% of the UV light in the wavelength region from 180 to 400 nm. The RUVA are suitable if they are highly soluble in polymers, highly absorptive, photo-permanent and thermally stable in the temperature range from 200 to 300° C. for an extrusion process to form the protective layer. The UVA can also be highly suitable if they can be copolymerizable with monomers to form protective coating layer by UV curing, gamma ray curing, e-beam curing, or thermal curing processes.

The RUVA have enhanced spectral coverage in the long-wave UV region, enabling such UV absorbers to block the high wavelength UV light that can cause yellowing in polyesters. Typical protective layer thicknesses are from 0.5 to 15 mils comprising a RUVA loading level of 2-10%. One of the most effective RUVA is a benzotriazole compound, 5-trifluoromethyl-2-(2-hydroxy-3-alpha-cumyl-5-tert-octyl-phenyl)-2H-benzo-triazole (CGL-0139). Other preferred benzotriazoles include 2-(2-hydroxy-3,5-di-alpha-cumylphehyl)-2H-benzotriazole, 5-chloro-2-(2-hydroxy-3-tert-butyl-5-methylphenyl)-2H-benzothiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole. Further preferred RUVA include 2(-4,6-Diphenyl-1-3,5-triazin-2-yl)-5-hekyloxy-phenol. Exemplary UVAs include those available from Ciba Specialty Chemicals Corporation, Tarrytown, N.Y. under the trade designation Tinuvin 1577, Tinuvin 900, and Tinuvin 777. In addition, the UVAs can be used in combination with hindered amine light stabilizers (HALS) and anti-oxidants. Exemplary HALS include those available from Ciba Specialty Chemicals Corporation, Tarrytown, N.Y. under the trade designation Chimassorb 944 and Tinuvin 123. Exemplary anti-oxidants include Irganox 1010 and Ultranox 626, also available from Ciba Specialty Chemicals Corporation, Tarrytown, N.Y.

The multilayer optical film and/or the non-optical skin layer and/or the top coat can comprise inorganic oxide nanoparticles, such as non-pigmentary zinc oxide and titanium oxide, as light blocking or scattering additives. For example, nano-scale particles can be dispersed in polymer or coating substrates to minimize UV radiation degradation. The nano-scale particles are transparent to visible light while either scattering or absorbing harmful UV radiation thereby reducing damage to thermoplastics. The concentration of such inorganic oxide nanoparticles is typically less than 5, 4, 3, 2, or 1 wt-%. Further, since the plurality of layer-by-layer self-assembled layers can minimize UV radiation degradation by reflecting UV radiation, in some embodiments, the multilayer optical film (inclusive of the optional layer(s) is free of inorganic oxide particles.

It is within the scope of the present disclosure to include UV protective topcoats and/or skin layers on both major surfaces of the multilayer optical film. In some embodiments, it may be desirable to have a UV protective topcoat and/or skin layer only between the multilayer optical film and the plurality of layers deposited by layer-by-layer self-assembly or only on the opposite surface as the plurality of layers deposited by layer-by-layer self-assembly.

Optional UV protective hardcoats can be provided by techniques known in the art, including those described in U.S. Pat. No 7,153,588 (McMan et al.) and PCT application no. PCT/US2013/031249 (Clear et al.). Additional hard coats include silica filled siloxanes available, for example, from California Hard Coat, San Diego, Calif., under the trade designation "PERMANEW", and from Momentive Performance Materials, Albany, N.Y., under the trade designations "AS4000", "AS4700", and UVHC-3000. Exemplary acrylic UV protective hardcoats are available, for example, under the trade designations "UVT610(GEN IV)" and "UVT200" from Red Spot Paint & Varnish Company, Evansville, Ind. Exemplary UV protective acrylic hard coats are disclosed, for example, in PCT application no. PCT/US2013/031249, filed Mar. 14, 2013. Use of hardcoats can, for example, reduce or prevent premature degradation of the article due to exposure to outdoor elements. The hardcoat is generally abrasion and impact resistant and does not interfere with the primary function of reflecting a selected bandwidth of electromagnetic radiation.

In some favored embodiments, the multilayer optical film comprises or consists of quarterwave film stacks. In this case, control of the spectrum requires control of the layer thickness profile in the film stack. A broadband spectrum, such as one required to reflect visible light over a large range of angles in air, still requires a large number of layers if the layers are polymeric, due to the relatively small index differences achievable with polymer films compared to inorganic films. Layer thickness profiles of such films can be adjusted to provide for improved spectral characteristics using the axial rod apparatus taught in U.S. Pat. No. 6,783,349 (Neavin et al.); incorporated herein by reference combined with layer profile information obtained with microscopic techniques.

Other techniques for controlling the spectrum include: 1) timely layer thickness profile feedback during production from a layer thickness measurement tool such as e.g. an atomic force microscope (AFM), a transmission electron microscope, or a scanning electron microscope; 2) optical modeling to generate the desired layer thickness profile; and 3) repeating axial rod adjustments based on the difference between the measured layer profile and the desired layer profile.

The basic process for layer thickness profile control involves adjustment of axial rod zone power settings based on the difference between the target layer thickness profile and the measured layer profile. The axial rod power increase needed to adjust the layer thickness values in a given feedblock zone may first be calibrated in terms of watts of heat input per nanometer of resulting thickness change of the layers generated in that heater zone. Fine control of the spectrum is possible using 24 axial rod zones for 275 layers. Once calibrated, the necessary power adjustments can be calculated once given a target profile and a measured profile. The procedure is repeated until the two profiles converge.

The layer thickness profile (layer thickness values) of a UV reflector, for example, can be adjusted to be approximately a linear profile with the first (thinnest) optical layers adjusted to have about a ¼ wave optical thickness (index times physical thickness) for 340 nm light and progressing to the thickest layers which can be adjusted to be about ¼ wave thick optical thickness for 420 nm light.

By use of any of such techniques for providing a multilayer optical film with a controlled spectrum, various multilayer optical films can be produced.

In some embodiments, the multilayer optical film can be characterized as a UV reflective multilayer optical film (also referred to herein as a UV reflector or UV mirror). A UV reflective multilayer optical film refers to a film having a reflectivity at normal incidence of at least 50, 60, 70, 80, or 90% for a bandwidth ranging from 290 nm to 400 nm. In some embodiments, the reflectivity at normal incidence for a bandwidth ranging from 290 nm to 400 nm is at least 91, 92, 93, 94, 95, 96, 97, or 98%. A UV reflective multilayer optical film can have low reflectivity and high transmission for visible light. For example the transmission of visible light can be at least 85% or 90%.

One illustrative UV reflector can be made from first optical layers of PET polyethylene terephthalate ("PET") (obtained under the trade designation "EASTAPAK 7452"

from Eastman Chemical, Kingsport, Tenn.) and second optical layers of a coPMMA of 75 wt.-% methyl methacrylate and 25 wt.-% ethyl acrylate (obtained under the trade designation "PERSPEX CP63" from Plaskolite, Columbus, Ohio).

The PET and coPMMA can be coextruded through a multilayer polymer melt manifold to form a stack of 550 optical layers. The layer thickness profile (layer thickness values) of this UV reflector can be adjusted to be approximately a linear profile with the first (thinnest) optical layers adjusted to have about a ¼ wave optical thickness (index times physical thickness) for 300 nm light and progressing to the thickest layers which can be adjusted to be about ¼ wave thick optical thickness for 400 nm light. Layer thickness profiles of such films can be adjusted to provide for improved spectral characteristics as previously described using the axial rod apparatus combined with layer profile information obtained with atomic force microscopic techniques.

In one embodiment, the UV reflective multilayer optical film further comprises a non-optical protective skin layer comprising a blend of 62 wt.-% PMMA (CP82 from Plaskolite), 35wt.-% PVDF (Dyneon 6008), and 3wt.-% of UV absorber (obtained from Ciba Specialty Chemicals Corporation, Tarryton, N.Y., under the trade designation "TINUVIN 1577 UVA") compounded into these protective skin layers. This multilayer coextruded melt stream can be cast onto a chilled roll at 5.4 meters per minute creating a multilayer cast web approximately 500 micrometers (20 mils) thick. The multilayer cast web can then be preheated for about 10 seconds at 95° C. and biaxially oriented at draw ratios of 3.5 x 3.7. The oriented multilayer film can be further heated at 225° C. for 10 seconds to increase crystallinity of the PET layers.

Such UV-reflective multilayer optical film (including the non-optical protective film) transmits less than 2 percent of the UV light over a bandwidth of 290-400 nm, as can be measured with a Lambda 950 spectrophotometer In another embodiment, the multilayer optical film can be characterized as a UV-blue reflective multilayer optical film (i.e. a UV-blue reflector or UV-blue mirror). A UV-blue reflective multilayer optical film refers to a film having a reflectivity at normal incidence of at least 50, 60, 70, 80, or 90% for a bandwidth ranging from 350 nm to 490 nm. In some embodiments, the reflectivity at normal incidence for a bandwidth ranging from 350 nm to 490 nm is at least 91, 92, 93, 94, 95, 96, or 97%. The UV-blue reflective multilayer optical film can have low reflectivity and high transmission for visible light having wavelength greater than 500 nm. For example the transmission of visible light having wavelength greater than 500 nm can be at least 85% or 90%.

One illustrative UV-blue reflector can be made from first optical layers of PET and coPMMA, as previously described, coextruded through a multilayer polymer melt manifold to form a stack of 550 optical layers. The layer thickness profile (layer thickness values) of this blue light reflector was adjusted to be about a linear profile with the first (thinnest) optical layers adjusted to have about a ¼ wave optical thickness (index times physical thickness) for 380 nm light and progressing to the thickest layers which were adjusted to be about ¼ wave thick optical thickness for 500 nm light. Layer thickness profiles of such films were adjusted to provide for improved spectral characteristics using the axial rod apparatus reported in U.S. Pat. No. 6,783,349 (Neavin et al.) combined with layer profile information obtained with atomic force microscopic techniques. In addition to these optical layers, non-optical protective skin layers comprising a blend of 62 wt.-% polymethylmethacrylate ("PMMA") (obtained under the trade designation "PERSPEX PCP82" from Plaskolite), 35 wt.-% polyvinylidene fluoride PVDF; obtained under the trade designation "DYNEON 6008" from DYNEON, Oakdale, Minn., and 3 wt.-% of UV absorber (obtained under the trade designation "TINUVIN 1577 UVA" from BASF, Florham Park, N.J.) compounded into these protective skin layers. This multilayer coextruded melt stream was cast onto a chilled roll at 4.3 meters per minute creating a multilayer cast web about 625 micrometers (25 mils) thick. The multilayer cast web was then preheated for about 10 seconds at 95° C. and biaxially oriented at draw ratios of 3.5×3.7. The oriented multilayer film was further heated at 225° C. for 10 seconds to increase crystallinity of the PET layers. The UV-blue reflective multilayer optical film was measured with the spectrophotometer ("LAMBDA 950") and determined to transmit less than 3 percent of the UV-blue light over a bandwidth of 350 nm-490 nm.

In another embodiment, the multilayer optical film can be characterized as a near infrared reflective multilayer optical film (i.e. near infrared reflector or near infrared mirror). A near infrared reflective multilayer optical film refers to a film having a reflectivity at normal incidence of at least 50, 60, 70, 80, or 90% for a bandwidth ranging from 870 nm to 1100 nm. In some embodiments, the reflectivity at normal incidence for a bandwidth ranging from 870 nm to 1100 nm is at least 91, 92, 93, or 94%. In some embodiments, the film exhibits this same near infrared reflectivity at a 45 degree angle. The near infrared reflective multilayer optical film can have low reflectivity and high transmission for visible light. For example the transmission of visible light can be at least 85%, 86%, 87% or 88%.

One illustrative near infrared reflective multilayer optical film can be made by coextruding PET and coPMMA through a multilayer polymer melt manifold to create a multilayer melt stream having 224 alternating birefringent layers and second polymer layers. In addition, a pair of non-optical PET layers can be coextruded as protective skin layers on either side of the optical layer stack. This multilayer coextruded melt stream can be cast onto a chilled roll at 22 meters per minute creating a multilayer cast web with a total thickness of approximately 700 microns thick and with a thickness of the optical layer stack of approximately 233 microns. The multilayer cast web can then be heated in a tenter oven at 105° C. for 10 seconds before being biaxially oriented to a draw ratio of 3.8×3.8. The oriented multilayer film can be further heated to 225° C. for 10 seconds to increase crystallinity of the PET layers.

The average reflectivity of this film is 94% over a bandwidth of 875 to 1100 nm at normal angles to the film. At a 45 degree angle, the average reflectivity is 96% over a bandwidth of 850 to 1150 nm. In transmitted light, this film can have a clear appearance at normal angle and a clear appearance at 45 to 60 degrees off normal angles. This film has a light transmission of 88% over the visible light wavelengths of 400 to 700 nm.

In other embodiments, a single multilayer optical film can reflect more than one bandwidth and may be considered a broadband reflector. For example, the multilayer optical film may be a visible and near infrared reflective multilayer optical film. Thus, such multilayer optical film has high reflectivity of both visible and near infrared bandwidths. A visible light reflective multilayer optical film (e.g. visible reflector or visible mirror) refers to a film having a reflectivity at normal incidence of at least 50, 60, 70, 80, or 90% for a bandwidth ranging from 400 nm to 700 nm. In some embodiments, the reflectivity at normal incidence for a bandwidth ranging from 400 nm to 700 nm is at least 91, 92, 93, 94, 95, 96, 97, or 98%. The near infrared reflectivity properties of such broadband reflector are as previously described.

One illustrative visible and near infrared reflective multilayer optical film can be made with first optical layers created from polyethylenenaphthalate (PEN) and second optical layers created from polymethylmethacrylate (PMMA) from Arkema Inc. Philadelphia, Pa. and sold under the trade designation "VO44". In this embodiment, the polyethylene 2,6 naphthalate (PEN) can be synthesized in a batch reactor with the following raw material charge: 2,6 dimethyl naphthalene dicarboxylate (136 kg), ethylene glycol (73 kg), manganese (II) acetate (27 grams), cobalt(II) acetate (27 grams) and antimony(III) acetate (48 grams). Under a pressure of 1520 torr or $2 \times 10^5$ N/m$^2$ (2 atm.), this mixture can be heated to 254° C. while removing methanol (a transesterification reaction by-product). After removal of 35 kg of methanol, 49 grams of triethyl phosphonoacetate can be charged to the reactor and the pressure gradually reduced to (131 N/m$^2$) (1 torr) while heating to 290° C. The condensation reaction by-product, ethylene glycol, can be continuously removed until a polymer with an intrinsic viscosity of 0.48 dL/g (as measured in 60/40 wt. % phenol/o-dichlorobenzene) is produced. The PEN and PMMA can be coextruded thru a multilayer polymer melt manifold to create a multilayer melt stream having 550 alternating first and second optical layers. In addition to the first and second optical layers, a pair of non-optical layers also comprised of PEN can be coextruded as protective skin layers on either side of the optical layer stack. This multilayer coextruded melt stream can be cast onto a chilled roll at 22 meters per minute creating a multilayer cast web approximately 1075 microns (43 mils) thick. The multilayer cast web can then be heated in a tenter oven at 145° C. for 10 seconds prior to being biaxially oriented to a draw ratio of 3.8×3.8. The oriented multilayer film can be further heated to 225° C. for 10 seconds to increase crystallinity of the PEN layers. The average reflectivity of this multilayer film is 98.5% over a bandwidth of 400-1250 nm.

In yet other embodiments, the multilayer optical film is a reflective polarizer, such as known in the art. (See for example U.S. Pat. No. 6,352,761 (Hebrink et al.) and U.S. Pat. No. 7,345,137 (Hebrink et al.).)

In one embodiment, a multi-layer reflective polarizer film can be constructed with first optical layers created from polyethylenenaphthalate comprised of 100 mol % naphthalene dicarboxylate as the carboxylate, and 100 mol % ethylene glycol as the diol. Second optical layers can be created from copolyethylenenaphthalate comprised of 55 mol % naphthalene dicarboxylate and 45 mol % terephthalate as carboxylates, and 95.8 mol % ethylene glycol, 4 mol % hexane diol, and 0.2 mol % trimethylol propane as glycols. Polyethylenenaphthalate to form the first optical layers can be synthesized in a batch reactor with the following raw material charge: 136 kg dimethyl naphthalene dicarboxylate, 73 kg ethylene glycol, 27 grams manganese acetate, 27 grams cobalt acetate, and 48 g antimony tri-acetate. Under pressure of 2 atm, this mixture can be heated to 254° C. while removing the transesterification reaction by-product methanol. After 35 kg of methanol is removed, 49 g of triethyl phosphonoacetate can be charged to the reactor and the pressure gradually reduced to 1 torr while heating to 290° C. The condensation reaction by-product, ethylene glycol, can continuously be removed until a polymer with an intrinsic viscosity of 0.48, as measured in 60/40 wt. % phenol/dichlorobenzene, is produced. Copolyethylenenaphthalate used to form the second optical layers can be synthesized in a batch reactor with the following raw material charge: 88.5 kg dimethyl naphthalene dicarboxylate, 57 5 dimethyl terephthalate, 81 kg ethylene glycol, 4.7 kg hexane diol, 29 grams cobalt acetate, 29 g zinc acetate, 239 g trimethylol propane, and 51 g antimony tri-acetate. Under pressure of 2 atm, this mixture can be heated to 254° C. while removing the transesterification reaction by-product methanol. After 39.6 kg of methanol is removed, 56 g of triethyl phosphonoacetate can be charged to the reactor and then the pressure gradually reduced to 1 torr while heating to 290° C. The condensation reaction by-product, ethylene glycol, can be continuously stripped until a polymer with an intrinsic viscosity of 0.54, as measured in 60/40 wt. % phenol/dichlorobenzene, is produced. These CoPENs can then be coextruded through multi-layer die manifolds to create a multi-layer film with 839 alternating first and second optical layers. This particular multi-layer reflective film also contains internal protective layers and external protective layers that can comprise the same copolyethylene naphthalate as the second optical layers. This cast film can then be uniaxially oriented at a 6:1 draw after being heated to 163° C. to produce a reflective polarizer film of approximately 125 mm thickness. When this reflective polarizer is placed within an LCD computer display, the LCD display brightness increases by 56% which correlates to a "Gain" of 1.56. Increases in LCD display brightness are measured as Gain, which is the ratio of the brightness of an LCD display with brightness enhancing film to the brightness of an LCD display without the brightness enhancing film. Typically, the display brightness was measured with an LS-100 or LS-110 luminance meter (available from Konica Minolta).

Another reflective polarizing film may be constructed with first optical layers created from a polyethylene naphthalate and second optical layers created from cycloaliphatic polyester/polycarbonate blend commercially available from Eastman Chemical under the tradename "SA115", such as described in Example 10 of U.S. Pat. No. 7,345,137 (Hebrink et al.).

Figure 2A:
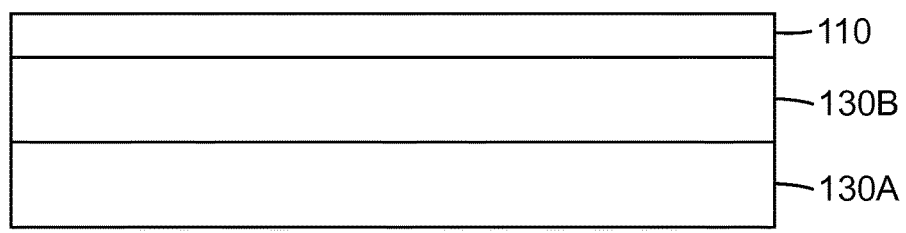
FIG. 2A is a cross sectional view of an embodiment comprising two different multilayer optical films 130A and 130B and a plurality of layers deposited by layer-by-layer self-assembly 110, disposed on the multilayer optical films.

In yet other embodiments, as illustrated in FIG. 2A, the multilayer optical film stack may comprise a combination of at least two, 130A and 130B, or more multilayer optical film mirrors, e.g. with different reflection bands, laminated together to broaden the reflection band. For example, a multilayer optical film visible reflector, such as previously described, can be combined with a UV, a UV-blue, and/or near infrared reflector. Various other combinations can be made as appreciated by one of ordinary skill in the art.

A plurality of layers deposited by layer-by-layer self-assembly is disposed upon a major surface of a multilayer optical film. The plurality of layers deposited by layer-by-layer self-assembly comprises at least two layers applied by what is commonly referred to as a "layer-by-layer self-assembly process". This process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. Typically, this deposition process involves exposing the (e.g. multilayer optical film) substrate having a surface charge, to a series of liquid solutions, or baths. This can be accomplished by immersion of the substrate into liquid baths (also referred to as dip coating), spraying, spin coating, roll coating, inkjet printing, and the like. Exposure to the first polyion (e.g. bath) liquid solution, which has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. In order for mass transfer and adsorption to occur, this exposure time is typically on the order of minutes. The substrate is then removed from the first polyion (e.g. bath) liquid solution, and is then exposed to a series of water rinse baths to remove any physically entangled or loosely bound polyelectrolyte. Following these rinse (e.g. bath) liquid solutions, the substrate is then exposed to a second polyion (e.g. bath) liquid solution, which has charge opposite that of the first polyion (e.g. bath) liquid solution. Once again adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bi-layer" of deposition and can be repeated as desired to add further layer pairs to the substrate.

Some examples of suitable processes include those described in Krogman et al., U.S. Pat. No. 8,234,998; Hammond-Cunningham et al., US2011/0064936; and Nogueira et al., U.S. Pat. No. 8,313,798. Further layer-by layer dip coating can be conducted using a StratoSequence VI (nanoStrata Inc., Tallahassee, Fla.) dip coating robot.

In contrast to the multilayer optical film, wherein a low index layer is alternated with a high index layer; in the case of the self-assembled layers, a plurality of bi-layers typically forms a low or high refractive index stack. A low refractive index stack is then alternated with a high refractive index stack.

Figure 1B:
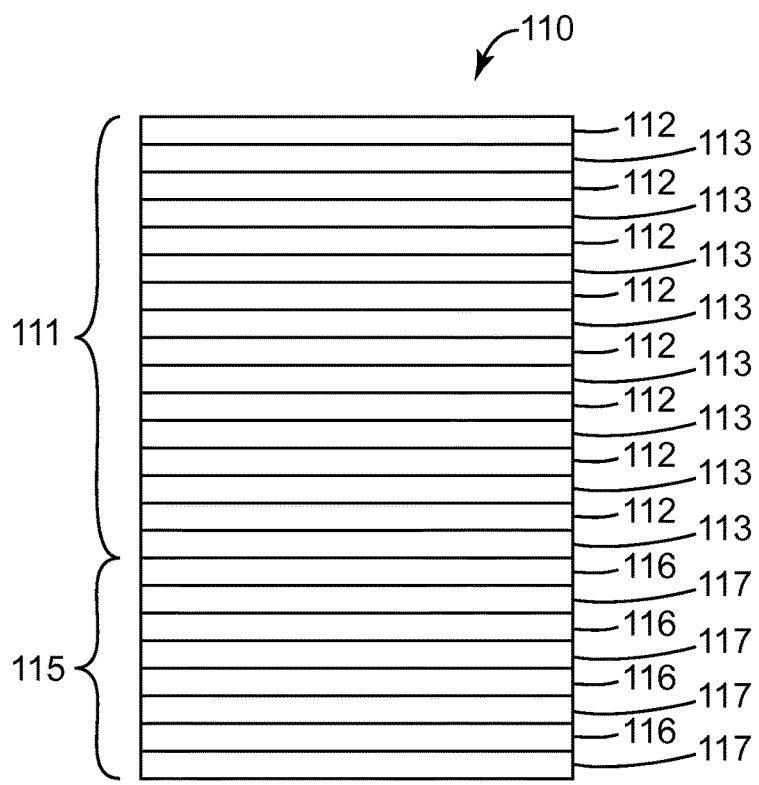
FIG. 1B is a cross sectional view of 110, the plurality of layers deposited by layer-by-layer self-assembly.

For example, with reference to FIG. 1B, high refractive index stack 111 may comprise bi-layers of 112 that comprise high refractive index inorganic oxide nanoparticles, such as $TiO_2$, as a polycation, and 113, a polymeric polyanion such as PSS. In FIG. 1B the illustrative high refractive index stack 111 comprises 8 alternating bi-layers. Low refractive index stack 115 may comprise bi-layers of 116 that comprise low refractive index inorganic oxide nanoparticles, such as $SiO_2$, as a polyanion and 117, a polymeric polycation such as PDAC. In FIG. 1B the illustrative low refractive index stack 115 comprises 4 alternating bi-layers. Each stack can be characterized as a high or low refractive index layer comprising a plurality of polymer-inorganic oxide bi-layers.

In some embodiments, the thickness of a bi-layer, the number of bi-layers per stack, the number of stacks, and the thickness of each stack are selected to achieve the desired optical properties using the minimum total thickness of self-assembled layers and/or the minimum number of layer-by-layer deposition steps. In such embodiments, the thickness of each bi-layer typically ranges from about 1 nm to 100 nm. In such embodiments, the number of bi-layers per stack typically ranges from about 1 to 200. In such embodiments, the number of stacks is typically 1, 2, 3, or 4 and no greater than 20, 19, 18, 17, or 15. In such embodiments, the thickness of a stack is typically at least 25 nm, 35 nm, 45 nm, 55 nm, 65 nm, 75 nm, or 85 nm and no greater than 300 nm, 250 nm, 200 nm, or 150 nm. In other embodiments, the number of bi-layers is selected to achieve the desired transmission in combination with mechanical durability. In this embodiment, the thickness of a bi-layer and number of bi-layers may approach the maximum values. Further, this embodiment may utilize a single stack of low or high refractive index that may be index matched to the multilayer optical film to which it is applied.

Although layer-by-layer self-assembly can be utilized to deposit alternating polymer-polymer layers and alternating inorganic nanoparticle-inorganic nanoparticle layers, in favored embodiments, the plurality of layers deposited by layer-by-layer self-assembly comprises a plurality of alternating polymer-inorganic nanoparticle layers.

A pair of strong polyelectrolytes is typically utilized as the polymer of the polymer-inorganic nanoparticle layers. For example, poly(sodium 4-styrene sulfonate) (SPS) is typically utilized in the negatively charged anionic layer in combination with poly(dimethyldiallyammonium chloride (PDAC) as the positively charged cationic layer.

While PDAC and SPS is known it be one of the most stratified layer-by-layer material combinations, other polyelectrolytes can be used as known in the art. Other suitable polycationic polymers include, but are not limited to, linear and branched poly(ethyleneimine), poly(allylamine hydrochloride), polyvinylamine, chitosan, polyaniline, polypyrrole, polyamidoamine, and poly(vinylbenzyltriamethylamine). Other suitable polyanionic polymers include, but are not limited to, poly(vinyl sulfate), poly(vinyl sulfonate), poly(acrylic acid), poly(methacrylic acid), dextran sulfate, heparin, hyaluronic acid, carrageenan, carboxymethylcellulose, alginate, sulfonated tetrafluoroethylene based fluoropolymers such as Nafion®, poly(vinylphosphoric acid), poly(vinylphosphonic acid), and sodium hexametaphosphate.

The molecular weight of the polyelectrolyte can vary, ranging from about 1,000 g/mole to about 1,000,000 g/mole. In some embodiments, the molecular weight (Mw) of the (e.g. SPS) negatively charged anionic layer ranges from 50,000 g/mole to 100,000 g/mole. In some embodiments, the molecular weight (Mw) of the (e.g. PDAC) positively charged cationic layer ranges from 200,000 g/mole to 300,000 g/mole. In some embodiments, the ratio of the molecular weight of the polyelectrolytes can vary from 3:1 to 4:1.

The inorganic nanoparticles of the alternating polymer-inorganic nanoparticle layers typically have an average primary or agglomerate particle size diameter of at least 1, 2, 3, 4, or 5 nanometers and typically no greater than 80, 90 or 100 nanometers. The average particle size of the nanoparticles of the dried self-assembled layers can be measured using transmission electron microscopy or scanning electron microscopy, for example. The average particle size of the nanoparticles in the nanoparticle suspension can be measured using dynamic light scattering. "Agglomerate" refers to a weak association between primary particles which may be held together by charge or polarity and can be broken down into smaller entities. "Primary particle size" refers to the mean diameter of a single (non-aggregate, non-agglomerate) particle. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e. at least 50%) are present as discrete unagglomerated nanoparticles. For example, at least 70%, 80% or 90% of the nanoparticles are present as discrete unagglomerated nanoparticles.

In some embodiments the (e.g. silica) nanoparticles have a relatively small average particle size. For example, the average primary or agglomerate particle size may be less than 30 nm, or 25 nm, or 20 nm, or 15 nm.

The concentration of inorganic nanoparticles is typically at least 30 wt.-% of the dried low refractive index stack, high refractive index stack, or totality of self-assembled polymer-nanoparticle layers. The concentration of inorganic nanoparticles is typically no greater than about 80, 85, or 90 wt.-%. The concentration of inorganic nanoparticles can be determined by methods known in the art, such as thermogravimetric analysis. In some embodiments, the dried low refractive index stack, high refractive index stack, or totality of self-assembled polymer-nanoparticle layers comprises at least 50, 55, 60, 65, or 70 wt.-% of inorganic nanoparticles to provide better mechanical durability and scratch resistance in addition to the reflectivity properties previously described.

In some embodiments, the nanoparticles of the low refractive index stack or layer-by-layer self-assembled top coat have a refractive index of no greater than 1.50, such as silica. Nanoparticles for use in the low refractive index bi-layer or stack can include silica (although other oxides can be used, such as zirconia, alumina, ceria, tin (stannic) oxide,), or composite nanoparticles such as core-shell nanoparticles. A core-shell nanoparticle can include a core of an oxide (e.g., iron oxide) or metal (e.g., gold or silver) of one type and a shell of silica deposited on the core. Herein, "silica nanoparticles" refer to nanoparticles that include only silica as well as core-shell nanoparticles with a surface that includes silica. It is appreciated however, that unmodified silica nanoparticles commonly comprise hydroxyl or silanol functional groups on the nanoparticle surface, particularly when the nanoparticles are provided in the form of an aqueous dispersion. Aqueous dispersions of silica nanoparticles can also be ammonium or sodium stabilized. Silica has an isoelectric point at about pH 2 and can thus be used as a polyanion in the layer-by-layer self-assembly process at pH values greater than 2, more preferably at pH values greater than or equal to 3.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del.), NYACOL (available from Nyacol Co., Ashland, Mass.) or NALCO (manufactured by Nalco Chemical Co., Oak Brook, Ill.). Some useful silica sols are NALCO 1115, 2326, 1050, 2327, and 2329 available as silica sols with mean particle sizes of 4 nanometers (nm) to 77 nm. Another useful silica sol is NALCO 1034a available as a silica sol with mean particle size of 20 nanometers. A useful silica sol is NALCO 2326 available as a silica sol with mean particle size of 5 nanometers. Additional examples of suitable colloidal silicas are described in U.S. Pat. No. 5,126,394 (Revis et al.).

Clay platelet nanoparticles, such as montmorillonite, bentonite, and hectorite nanoparticles may be used, particularly for embodiments wherein the self-assembled layers provide a durable top coat for the multilayer optical film. Clay platelet-containing layer-by-layer self-assembled coatings can also impart flame retardance, oxygen barrier, water barrier, and corrosion-resistance properties to a coated substrate.

In some embodiments, the nanoparticles of the layer-by-layer self-assembled high refractive index bi-layer, stack or self-assembled top coat have a refractive index of greater than 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60 such as titania, zirconia, alumina, tin oxides, antimony oxides, ceria, zinc oxide, lanthanum oxide, tantalum oxide, mixed metal oxides thereof, and mixtures thereof. Zirconia sols are available from Nalco Chemical Co. under the trade designation "Nalco OOSS008", Buhler AG Uzwil, Switzerland under the trade designation "Buhler zirconia Z-WO sol" and Nissan Chemical America Corporation under the trade name NanoUse ZR™. Zirconia nanoparticles can also be prepared such as described in U.S. Patent Publication No. 2006/0148950 (Davidson et al.) and U.S. Pat. No. 6,376,590 (Kolb et al.). A nanoparticle dispersion that comprises a mixture of tin oxide and zirconia covered by antimony oxide (RI ~1.9) is commercially available from Nissan Chemical America Corporation under the trade designation "HX-05M5". A tin oxide nanoparticle dispersion (RI~2.0) is commercially available from Nissan Chemicals Corp. under the trade designation "CX-S501M".

In some embodiments, the layer-by-layer self-assembled bi-layer, stack, or top coat comprises titania. Various forms of titania can be utilized including anatase, brookite, rutile and amorphous forms. Anatase titania nanoparticles (5-15 nm diameter) is commercially available from U.S. Research Nanomaterials, Houston, Tex. as an aqueous suspension at 15 wt%. $TiO_2$ sols are also available dispersed in strong acid or base condition from Ishihara Sangyo Kaisha Ltd. Titania has an isoelectric point at about pH 4-6 and thus can be used as a polyanion in layer-by-layer self-assembly at pH greater than 6, preferably pH greater than 7, more preferably pH greater than 8, or the polycation in layer-by-layer self-assembly at pH less than 4, more preferably pH less than 3.

Various other organic and inorganic nanoparticle particles can be used for the low refractive index or high refractive index layer of the self-assembled layers, as known in the art, some of which are described in Kurt et al., US 2010/0290109.

The selection of the inorganic materials used in creating the multilayer inorganic layer will depend upon the reflection bandwidth of interest. For example, the plurality of layers deposited by layer-by-layer self-assembly can be a ¼ wave stack wherein control of the spectrum is achieved by controlling the thickness of the high and low refractive index stacks by altering the number of deposited bi-layers and/or altering the conditions during the layer-by-layer self-assembly process such as the pH and ionic strength of the liquid (e.g. bath) solutions. It is appreciated that the plurality of layers deposited by layer-by-layer self-assembly typically does not utilize birefringence for creating a refractive index difference between the low refractive and high refractive index stacks.

The plurality of layers deposited by layer-by-layer self-assembly can be a non-quarter wave stack such as described in Kurt et al, US2010/0290109.

In some favored embodiments, the plurality of layers deposited by layer-by-layer self-assembly also functions as a UV mirror, blue mirror, visible mirror, near infrared mirror, or combination thereof.

Figure 2B:
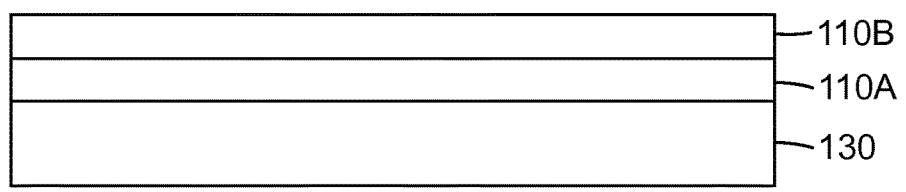
FIG. 2B is a cross sectional view of an embodiment comprising multilayer optical film 130 and two different types 110A and 110B of a plurality of layers deposited by layer-by-layer self-assembly, disposed on the multilayer optical film.

In some embodiments, as illustrated in FIG. 2B the multilayer optical film 130 may comprise a combination of at least two, 110A and 110B or layer-by-layer self-assembled stacks, e.g. with different reflection bands to broaden the reflection band. For example, a multilayer optical film visible reflector, such as previously described, can be combined with a UV, a blue, and/or near infrared reflector layer-by-layer self-assembled stacks. Various other combinations can be made as appreciated by one of ordinary skill in the art.

Figure 3:
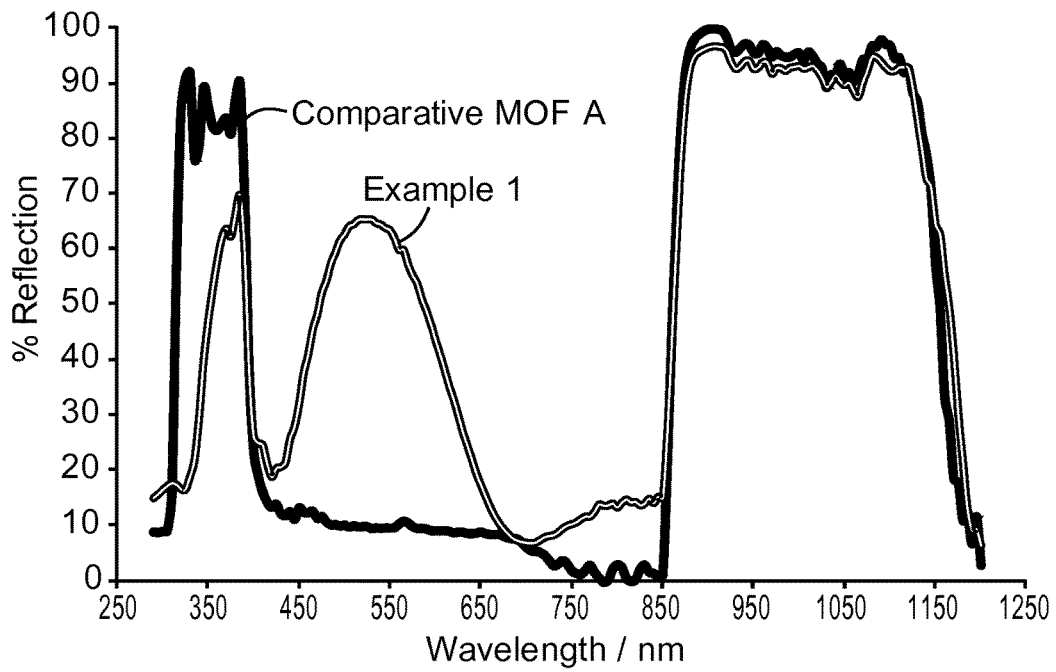
FIG. 3 depicts the % reflection of a comparative multilayer optical film and the same multilayer optical film further comprising a plurality of layers deposited by layer-by-layer self-assembly.

The plurality of layers deposited by layer-by-layer self-assembly is selected to reflect a desired bandwidth that complements the multilayer optical film. In some embodiments, the plurality of layers deposited by layer-by-layer self-assembly reflects at least a portion of the same bandwidth of electromagnetic radiation as the multilayer optical film. For example with reference to FIG. 3 the inclusion of the plurality of layers deposited by layer-by-layer self-assembly can increase the average reflectivity (e.g. for visible light) from about 10% to 20, 30, or 35%.

In other embodiments, the plurality of layers deposited by layer-by-layer self-assembly reflects at least a portion of a different bandwidth of electromagnetic radiation than the multilayer optical film.

Figure 4:
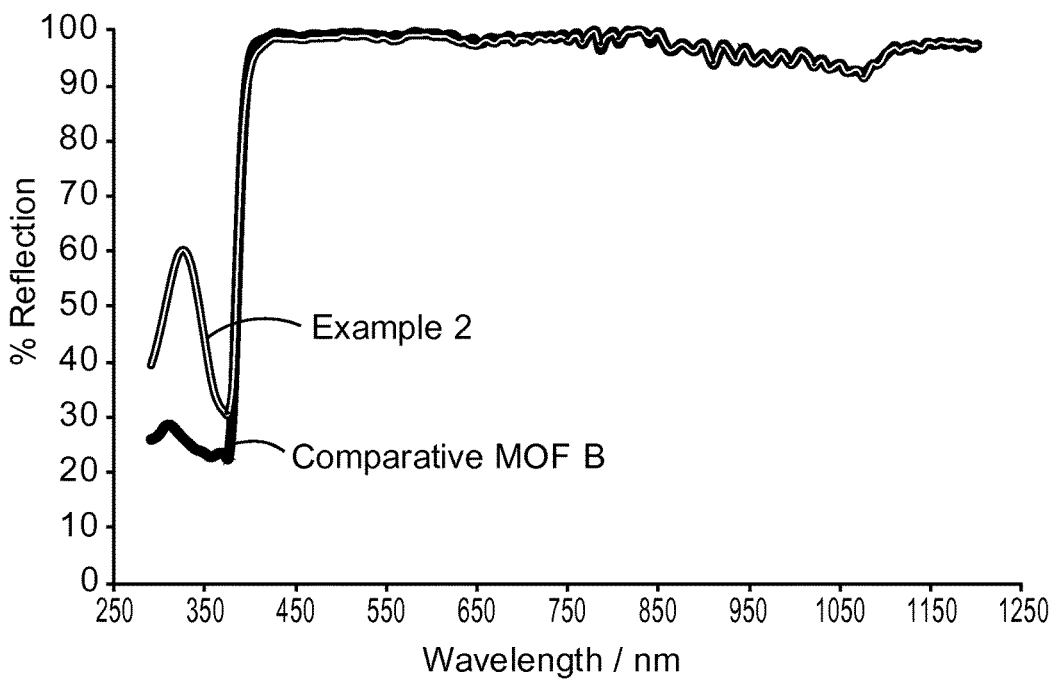
FIG. 4 depicts the % reflection of another comparative multilayer optical film and the multilayer optical film comprising a plurality of layers deposited by layer-by-layer self-assembly.

Solar light, in particular the ultraviolet radiation, can induce degradation of plastics, which in turn results in color change and deterioration of optical and mechanical properties Inhibition of photo-oxidative degradation is important for outdoor applications wherein long term durability is mandatory. The absorption of UV-light by polyethylene terephthalates, for example, starts at around 360 nm, increases markedly below 320 nm, and is very pronounced at below 300 nm. Polyethylene naphthalates strongly absorb UV-light in the 310-370 nm range, with an absorption tail extending to about 410 nm, and with absorption maxima occurring at 352 nm and 337 nm. Chain cleavage occurs in the presence of oxygen, and the predominant photooxidation products are carbon monoxide, carbon dioxide, and carboxylic acids. Besides the direct photolysis of the ester groups, consideration has to be given to oxidation reactions, which likewise form carbon dioxide via peroxide radicals. Thus, in some favored embodiments, the plurality of layers deposited by layer-by-layer self-assembly functions as a UV mirror to protect the polymeric multilayer optical film from UV degradation. For example, with reference to FIG. 4 the inclusion of the plurality of layers deposited by layer-by-layer self-assembly can increase the average reflectivity (e.g. for UV light) from about 35% to 40, 45, or 50%. In yet another embodiment, the inclusion of the plurality of layers deposited by layer-by-layer self-assembly can increase the average reflectivity (e.g. for 290-400 nm) from about 15% to 30, 35, 40, or 45%.

In addition to degradation caused by ultra-violet light, polymers (e.g., PEN (polyethylenenaphthalate) can degrade from exposure to blue light in the wavelength range of 400 nm to 490 nm. Furthermore, exposing PEN-based films protected by using UV filters blocking 99.99% of the light below 400 nm degrade when exposed to blue light. An exemplary film made with PEN is a highly reflective multilayer optical mirror film available under the trade designation "VIKUITI ENHANCED SPECULAR REFLECTOR (ESR)" from 3M Company, St. Paul, Minn. Use of UV stable multi-layer optical films described herein with highly reflective multilayer PEN-based optical mirror films in applications where there is exposure to blue light (e.g., brightness enhancement of LED lighted displays and daylighting light guides) can improve protection against degradation. A blue mirror (400-490 nm), or UV-blue Mirror (350-490 nm), as described herein can be used to protect PEN based films and articles.

In another embodiment, the layer-by-layer self-assembled layers can provide an antireflective coating for the multilayer optical film. This is particularly useful for multilayer optical films, such as polarizing films, window films, and IR mirror films that exhibits high transmission of visible light, i.e. at least 85% or 90% transmission. The inclusion of the layer-by-layer self-assembled layers can reduce the surface reflections and thus increase transmission by 1, 2, 3, 4, or 5%.

The physical principles by which antireflection films and coatings function are known. AR films are often constructed of alternating high and low refractive index ("RI") polymer layers of the correct optical thickness. With regards to visible light, this thickness is on the order of one-quarter of the wavelength of the light to be reflected. The human eye is most sensitive to light around 550 nm. Therefore it is desirable to design the low and high index coating thicknesses in a manner that minimizes the amount of reflected light in this optical range (e.g. 3%, 2%, 1% or lower). In some embodiments, the inclusion of the antireflective coating described herein reduces the average % reflection for 400 to 700 nm by at least 1, 2, 3, or 4%. Further the % reflection at 550 nm may be reduced by at least 1, 2, 3, or 4% as compared to the multilayer optical film lacking the antireflective layer-by-layer coating. An antireflective coating can be created by coating $SiO_2$ containing bi-layers at an optical thickness of ¼ wave. In other embodiments, the antireflective coating comprises at least one low refractive index bi-layer stack and at least one high refractive index bi-layer stack.

In yet another embodiment, the layer-by-layer self-assembled layers can provide a durable protective topcoat for the multilayer optical film. In this embodiment, the layer-by-layer self assembled stack may comprise a low or high refractive index stack, index matched to the refractive index of the multi-layer optical film. Layer-by-layer self-assembled coatings with improved mechanical strength and wear resistance have been taught in US 2012/0148829 (Krogman et al.) and WO 2012/112624 (Olmeijer et al.)

The multilayer optical films described herein comprising a plurality of layers deposited by layer-by-layer self-assembly are suitable for various uses, depending on the reflectivity properties. For example, the reflective polarizing film comprising a layer-by-layer self-assembled antireflective coating or UV protective layer is suitable for use in various liquid crystal displays (LCD) and light-emitting diode displays (LEDs).

The UV, IR and visible mirrors may be used in architectural applications, greenhouse applications, solar power applications, lighting, fenestration products, and/or other applications. The multilayer optical films of the present disclosure (i.e. comprising a plurality of layers deposited by layer-by-layer self-assembly) may offer advantages including: non- or reduced flammability, improved corrosion resistance, anti-fogging features, easy clean features, self-cleaning features, resistance to bacterial, fungal, or viral growth or adhesion, and/or improved UV- and weathering-stability and/or improved mechanical durability such as scratch resistance, as compared to multilayer optical films lacking the plurality of layers deposited by layer-by-layer self-assembly.

In some embodiments, the multilayer optical films of the present disclosure may be used in architectural applications as for example a roof covering, a partial roof covering, a facade covering, or a dome covering. The multilayer optical film used in architectural applications may be designed so as to transmit visible light, but reflect infrared wavelengths, allowing for a transparent covering that will decrease heat load in buildings. In another embodiment, the multilayer optical film used in greenhouse applications may be designed so as to reflect UV wavelengths to allow for maximum plant growth. In another embodiment, the multilayer optical film of the present disclosure may be used in solar power applications. For example, in solar power applications, the multilayer optical film may be used in solar cells, solar collection (thermal heating), solar photovoltaic cells, concentrated photovoltaic, or concentrated solar power applications. In another embodiment the multilayer optical film of the present disclosure may be used in lighting applications such as shatter resistant lamp covers or reflectors. In another embodiment the multilayer optical film of the present disclosure may be used in fenestration products (i.e., products that fill openings in a building, such as windows, doors, skylights, or curtain walls, e.g., that are designed to permit the passage of light). In another embodiment, the multilayer optical film of the present disclosure may be used in commercial graphics films (e.g. films for billboards, building exteriors, signage, automobiles, mass transit vehicles, etc.) In another embodiment, the multilayer optical film of the present disclosure may be used in traffic signage. In another embodiment, the multilayer optical films of the present disclosure may be used in car wrap film or paint protection film.

In some favored embodiments, the multilayer optical film of the present disclosure is utilized as a broadband reflector for solar concentrators of solar cells of solar power systems.

Figure 5:
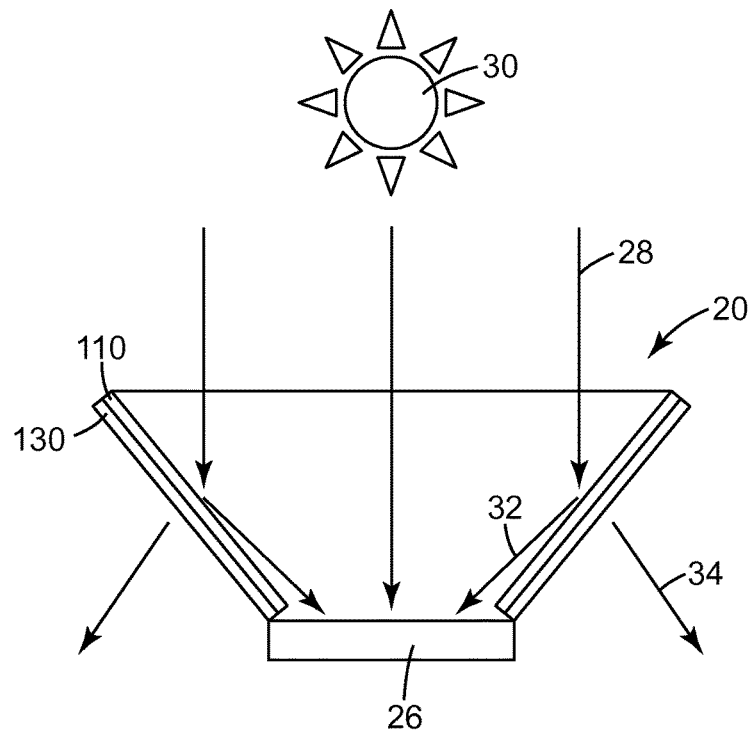
FIG. 5 is a schematic view of a solar cell.

As described for example in US2009/0283144 (Hebrink et al.); incorporated herein by reference, FIG. 5 illustrates a general application of the article 20 as a solar concentrating mirror. Article 20 comprises a multilayer optical film 130 having self-assembled layers 110 positioned in close proximity to a solar cell 26. The article 20 receives electromagnetic radiation 28 from the sun 30. A select bandwidth 32 of the electromagnetic radiation 28 is reflected onto solar cell 26. An undesirable bandwidth 34 of electromagnetic radiation passes through article 20 and is not reflected onto solar cell 26.

Figure 6:
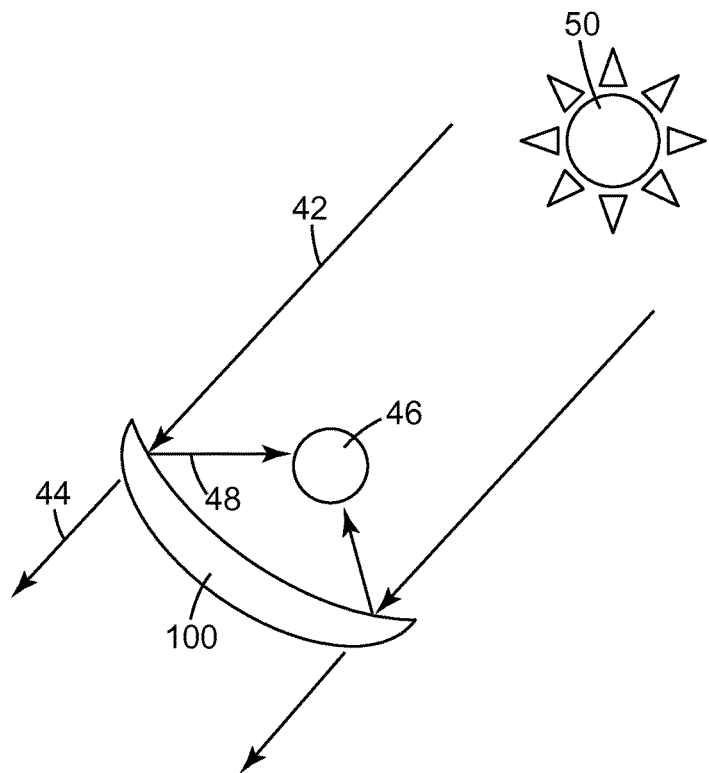
FIG. 6 is a schematic view of another embodiment of a solar cell.

FIG. 6 is another general embodiment depicting the inventive article in the form of a parabolic solar concentrating mirror 100. Electromagnetic radiation 42 from the sun 50 is received by the parabolic solar concentrating mirror 100. A preferred bandwidth 48 is reflected onto a solar cell 46 while an undesirable bandwidth 44 of electromagnetic radiation passes through the parabolic solar concentrating mirror 100 and is not reflected onto the solar cell 46 where it could potentially alter the operational efficiency of the solar cell. The shape of the article may include parabolic or other curved shapes, such as for example sinusoidal.

Figure 7:
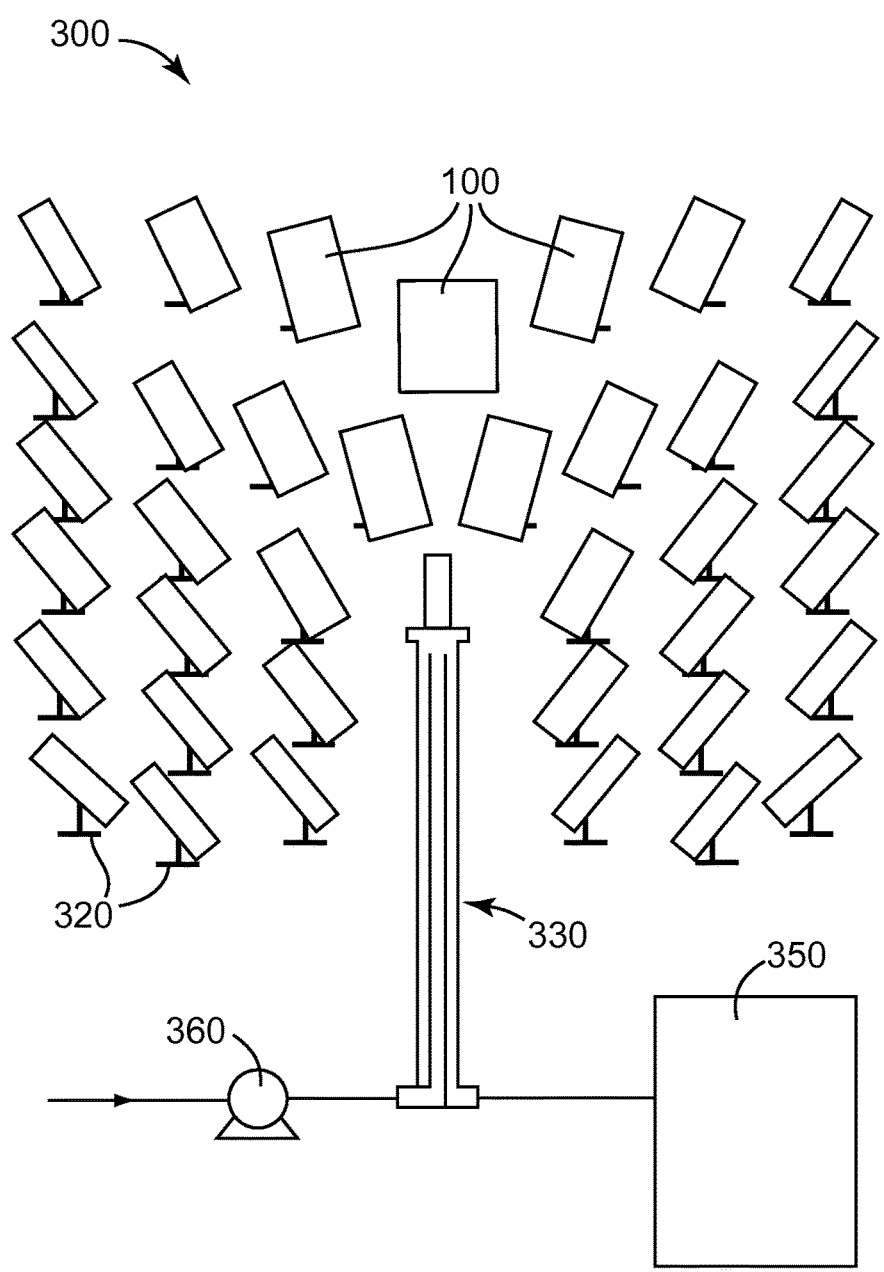
FIG. 7 is a schematic plan view of a concentrated solar power system.

As described for example in US2012/0011850 (Hebrink et al.); incorporated herein by reference, an exemplary concentrated solar power system 300 is depicted schematically in FIG. 7. Concentrated solar power system 300 comprises broadband reflectors 100 connected to celestial tracking mechanism 320 that is capable of aligning direct solar radiation from broadband reflectors 100 onto hollow receiver 330. A heat transfer fluid circulates by means of pump 360 through the hollow receiver 330 where it is heated by concentrated solar radiation. The heated heat transfer fluid is then directed to an electrical generator 350 (e.g., a steam turbine) where the thermal energy is converted to electrical energy. In another embodiment, the heat transfer fluid may be directed to a heat exchanger instead of the electrical generator, where the heat content is transferred to a liquid medium such as, for example, water that is converted to steam which drives the electrical generator.

Figure 8:
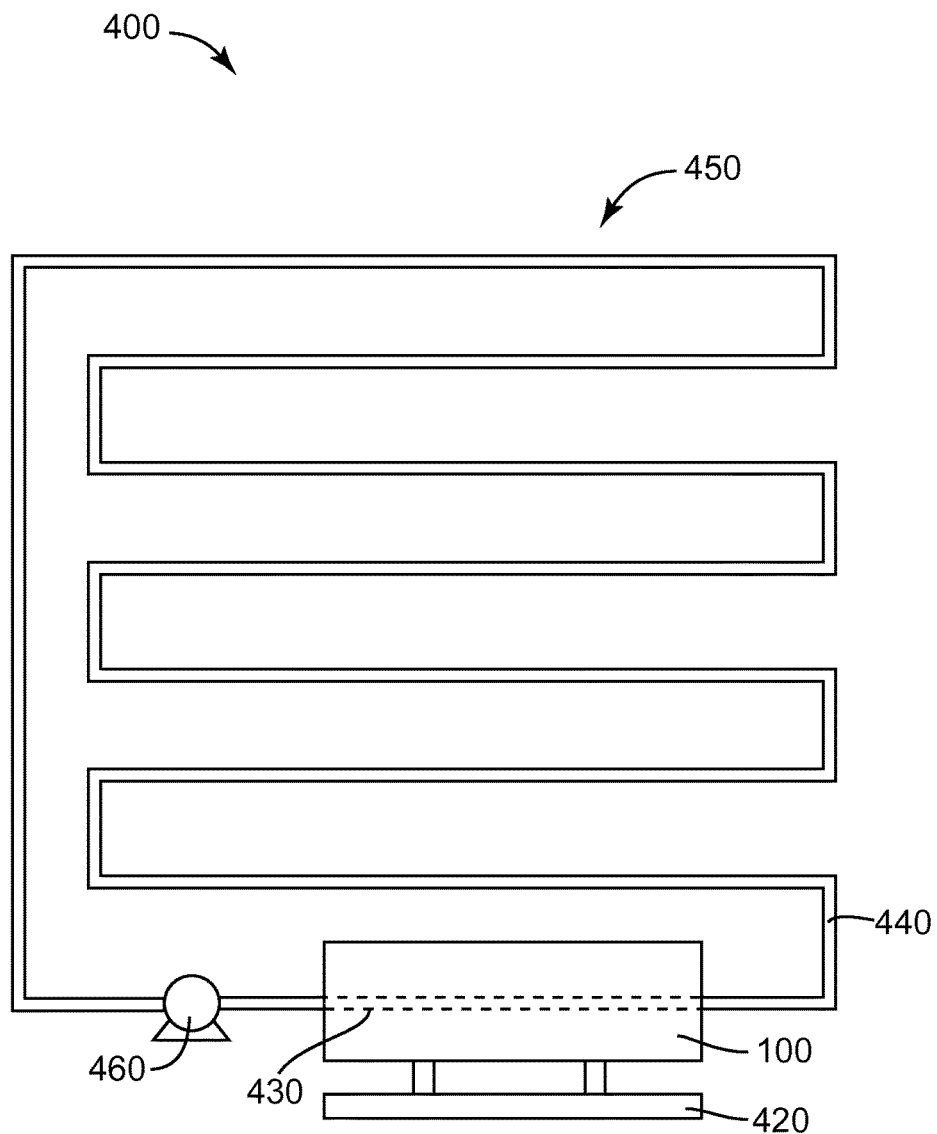
FIG. 8 is a schematic plan view of another embodiment of a concentrated solar power system.

Another exemplary concentrated solar power system 400 is depicted schematically in FIG. 8. Concentrated solar power system 400 comprises parabolic trough-shaped broadband reflectors 100 connected to celestial tracking mechanism 420 that is capable of aligning direct solar radiation from broadband reflectors 100 onto hollow receiver 430. A heat transfer fluid 440 circulates by means of pump 460 through the hollow receiver 430 where it is heated by concentrated solar radiation. The heated heat transfer fluid 440 is then directed to a thermal heating system 450 where the thermal energy is converted to electrical energy.

The hollow receivers may be transparent or opaque and should typically be made of material (e.g., metal or glass) that is capable of withstanding the light and heat directed upon it by the broadband reflectors. Exemplary heat transfer fluids include water, water/glycol mixtures, brine, molten salts, and oils, with the selected typically being dictated by application requirements and cost. Often the hollow receivers comprise an interior pipe coated with a solar absorbing material disposed inside an exterior transparent (e.g., glass) pipe, although other configurations may also be used. In some embodiments, the heated heat transfer fluid flowing through the solar absorbing hollow receiver exchanges heat with water to create steam that drives an electric generator.

Further enhancements in the concentrated solar polar system output may be achieved when anti-reflective surface structured films or coatings are applied to the front surface of the hollow receiver. Surface structures in the films or coating typically change the angle of incidence of light such that it enters the polymer and hollow receiver beyond the critical angle and is internally reflected, leading to more absorption by the hollow receiver. Such surface structures can be in the shape, for example, of linear prisms, pyramids, cones, or columnar structures. For prisms, typically the apex angle of the prisms is less than 90 degrees (e.g., less than 60 degrees). The refractive index of the surface structured film or coating is typically less than 1.55 (e.g., less than 1.50). These anti-reflective surface structured films or coatings can be made durable and easily cleanable with the use of inherently UV stable and hydrophobic or hydrophilic materials. Anti-reflective coatings (e.g., nanostructured coatings or low refractive index coatings) could also be applied to the interior glass surface of the hollow receiver. Durability of the anti-reflective coatings or films can be enhanced with the addition of inorganic nano-particles.

Broadband reflectors according to the present disclosure may also be useful, for example, for concentrated photovoltaic systems. For example, a broadband reflector disclosed herein may be useful when placed in proximity to a multi junction GaAs cell, which has an absorption bandwidth from about 350 nm to about 1750 nm, or a mono-crystalline silicon photovoltaic cell having an absorption bandwidth of about 400 nm to about 1150 nm. In some embodiments, a thermal management device (e.g., in the form of ribs, pins, or fins) may be used to dissipate heat from the solar cell.

Advantages and embodiments of this disclosure are further illustrated by the following examples, but the particular materials and amounts thereof recited in these examples, as well as other conditions and details, should not be construed to unduly limit this disclosure. All materials are commercially available or known to those skilled in the art unless otherwise stated or apparent.

EXAMPLES

Materials

Unless otherwise noted, all parts, percentages, ratios, etc., in the examples and in the remainder of the specification are by weight. Unless otherwise noted, all chemicals were obtained from, or are available from, chemical suppliers such as Aldrich Chemical Company, Milwaukee, Wis.

The following is a list of materials used throughout the Examples, as well as their brief descriptions and origins.

"$TiO_2$" refers to anatase titania nanoparticles (5-15 nm diameter), obtained from U.S. Research Nanomaterials, Houston, Tex. as an aqueous suspension at 15 wt %.

"$SiO_2$", unless specified otherwise, refers to silica nanoparticles (5 nm diameter, ammonium stabilized), obtained from Nalco Company, Naperville, Ill. as a 15 wt % aqueous dispersion under the trade designation "NALCO 2326".

"PDAC", also referred to as "PDADMAC", refers to poly (diallyl-dimethyl ammonium chloride), a positively charged polymer (i.e., polycationic polymer) with molecular weight 240K, obtained from PolySciences, Inc., Warrington, Pa. as a 20 wt % aqueous solution.

"PSS", also referred to as "SPS", refers to poly(sodium 4-styrenesulfonate), a negatively charged polymer (i.e., polyanionic polymer) with molecular weight 70K, obtained from Sigma Aldrich, St. Louis, Mo. as a 30 wt % aqueous solution.

"PAH" refers to poly(allylamine hydrochloride), a positively charged polymer (i.e., a polycationic polymer) with molecular weight 120K-200K, obtained from PolySciences, Inc., Warrington, Pa. as a powder.

"$HNO_3$" refers to nitric acid, obtained from VWR International, West Chester, Pa.

"LIQUINOX®" refers to liquid lab glassware cleaner made by Alconox, Inc., obtained from VWR International, West Chester, Pa.

"IPA" refers to 2-propanol, obtained from VWR International, West Chester, Pa.

"NaCl" refers to sodium chloride, obtained from VWR International, West Chester, Pa.

"NaOH" refers to sodium hydroxide, obtained from VWR International, West Chester, Pa. as a 1M solution in water.

Preparation of Multilayer Optical Film Infrared Mirror (MOF IR Mirror)

An MOF IR mirror film was prepared having birefringent layers of coextruded layers of poly(methylmethacrylate), CoPMMA available from Ineos Acrylics, Inc. under the trade designation "Perspex CP63", and polyethylene terephthalate, PET available from Eastman Chemical, Kingsport, Tenn. under the trade designation "EASTAPAK 7452.

Briefly, PET and CoPMMA were co-extruded through a multilayer polymer melt manifold to create a multilayer melt stream having 224 alternating birefringent layers and second polymer layers. In addition, a pair of non-optical PET layers was co-extruded as protective skin layers on either side of the optical layer stack. This multilayer, co-extruded melt stream was cast onto a chilled roll at 22 meters per minute creating a multilayer cast web with a total thickness of approximately 700 micrometers thick with the thickness of the optical layer stack being approximately 233 micrometers. The multilayer cast web was then heated in a tenter oven at 105° C. for 10 seconds before being biaxially oriented to a draw ratio of 3.8 by 3.8. The oriented multilayer film was further heated to 225° C. for 10 seconds to increase crystallinity of the PET layers.

The resulting multilayer MOF IR mirror had an average reflectivity (% R) of 94% over a bandwidth of 875 to 1100 nm at normal angles to the film, and an average reflectivity (% R) of 96% over a bandwidth of 875 to 1100 nm at a 45 degree angle. The reflectivity of the MOF IR mirrors was measured using a LAMBDA 950 UV/Vis/NIR Spectrophotometer (obtained from PerkinElmer, Inc., Waltham, Mass.).

In transmitted light, the MOF IR mirror appeared clear at normal angle as well as at 45 to 60 degrees off normal angles and transmitted 88% of light over the visible light wavelengths range of 400 to 700 nm.

Method for Determining the pH of the Coating Solutions

The pH of the solutions used for coating was determined using a VWR sympHony® rugged bulb pH electrode connected to a VWR sympHony® pH meter. Standard buffer solutions were used for calibration.

Method for Determining the Thickness and Refractive Index of Layer-by-Layer Self-Assembled Coatings The thickness and refractive index of layer-by-layer self-assembled coatings was measured using a variable angle spectroscopic ellipsometer (M-2000VI®, J. A. Woollam Co., Inc., Lincoln, Nebr.). The coatings used for these measurements were deposited on glass slides as substrates and consisted of single stack low refractive index coatings or single stack high refractive index coatings. The coatings were removed from the backside of the substrates with a razor blade. Scotch® Magic™ Tape (3M Company, St. Paul, Minn.) with matte finish was applied to the backside of the substrates prior to measurement in order to suppress backside reflections. Ellipsometric data were acquired from 370-1690 nm at incident angles of 50°, 60°, and 70°. The optical model used to describe the sample consisted of a Cauchy layer for the glass slide substrate and a separate Cauchy layer for the layer-by-layer self-assembled coating.

Method for Determining UV, Visible, and IR Transmittance and Reflectance of Samples The UV, visible, and IR transmittance and reflectance of samples prepared according to the examples described below were measured with a LAMBDA 1050 UV/Vis/NIR Spectrophotometer with an integrating sphere (obtained from PerkinElmer, Inc., Waltham, Mass.). The prepared coatings were removed from the backside of the substrates by swabbing with a cue tip dipped in 1M NaOH (in the case of polymer substrates). For reflection measurements, the backside of the sample was masked with black electrical tape to suppress backside reflections. Measurements were made at a near normal angle of incidence (i.e., 8° deviation from normal).

General Method for Preparing Layer-by-Layer Self-Assembled Coatings

Layer-by-layer (LBL) coatings of examples described below were made using a StratoSequence VI (nanoStrata Inc., Tallahassee, Fla.) dip coating robot. Glass microscope slide substrates (VWR International, West Chester, Pa.) were cleaned by immersing them in a 1% LIQUINOX® soap solution in water in a glass Coplin staining jar (VWR International, West Chester, Pa.) and sonicating for 15 minutes using a bath sonicator (Branson 3510 Ultrasonic Cleaner, available from Process Equipment and Supply Company, Cleveland, Ohio). Next, the slides were rinsed with deionized (DI) water and sonicated two times for 15 minutes each time and were stored in DI water at room temperature. The MOF substrates, as previously described, were cleaned by rinsing with them with IPA, then DI water, then drying with a stream of nitrogen gas.

To start the coating process on glass slides, the cleaned glass slides were immersed for at least 10 minutes in an aqueous solution of PDAC which was diluted to 0.1 wt % by adding DI water. To start the coating process on MOF substrates, the cleaned substrates were subjected to an air corona using a BD-20AC Laboratory Corona Treater (obtained from Electro-Technic Products, Inc., Chicago, Ill.) for approximately 30 seconds to impart a slight negative charge to the substrate. The substrates were then immediately immersed for at least 10 minutes in an aqueous solution of PDAC which was diluted to 0.1 wt % by adding DI water. The substrates were then rinsed thoroughly with DI water to remove any weakly bound polymer.

The substrates, which were now positively charged after adsorption of a layer of PDAC, were then mounted in the substrate holder for the StratoSequence VI dip coater. Next, a layer of PSS was deposited on the substrates to render them negatively charged by immersing the substrates for 1 minute in a solution of PSS (diluted to 0.1 wt % with DI water and pH adjusted to 2.0 with $HNO_3$), followed by three 30-second immersions in separate DI water baths.

High refractive index stacks were then coated on the substrates by immersing the substrates for 1 minute in a dispersion of $TiO_2$ (diluted to 0.1 wt % with DI water and pH adjusted to 2.0 with $HNO_3$, and NaCl added to a final concentration of 0.1 M), followed by three 30-second immersions in separate water baths adjusted to pH 2.0 with $HNO_3$. This was then followed by immersing the substrates for 1 minute in a solution of PSS (diluted to 0.1 wt % with DI water and pH adjusted to 2.0 with $HNO_3$), followed by three 30-second immersions in separate water baths adjusted to pH 2.0 with $HNO_3$. The substrates were rotated at about 90 rpm in each bath. This sequence was repeated for a desired number of cycles to form a high-index stack of desired thickness. High-index stacks were denoted as $(TiO_2/PSS)_n$, where n is the number of "bi-layers". A "bi-layer" was defined as the combination of a polycation (e.g. $TiO_2$) layer and a polyanion (e.g. PSS) layer.

Low refractive index stacks were then coated on the substrates by immersing the substrates for 1 minute in a solution of PDAC (diluted to 0.1 wt % with DI water, pH adjusted to 3.0 with $HNO_3$), followed by three 30-second immersions in separate water baths adjusted to pH 3.0 with $HNO_3$. This was then followed by immersing the substrates for 10 minutes in a suspension of $SiO_2$ (diluted to 0.1 wt % with DI water and pH adjusted to 3.0 with $HNO_3$), followed by three 30-second immersions in separate water baths adjusted to pH 3.0 with $HNO_3$. The substrates were rotated at about 90 rpm in each bath. This sequence was repeated for a desired number of cycles to form a low-index stack of desired thickness. Low-index stacks were denoted as $(PDAC/SiO_2)_m$, where m is the number of "bi-layers". A "bi-layer" was defined as the combination of a polycation (e,g, PDAC) layer and a polyanion (e.g. $SiO_2$) layer.

Multi-stack optical coatings consisted of alternating high-index stacks (denoted as "H") and low-index stacks (denoted as "L"). When preparing multi-stack optical coatings, the coatings were dried under a stream of $N_2$ between each stack.

Example 1 (EX1) and Comparative Example A
(CE-A)

CE-A was a sample of MOF IR mirror film as described above. EX1 was prepared by depositing a visible light reflective coating onto the MOF IR mirror film substrate using the layer-by-layer self-assembly method described above. The deposited self assembled layers consisted of high-index stacks of $(TiO_2/PSS)_8$ (i.e. 8 bi-layers) and low-index stacks of $(PDAC/SiO_2)_4$ (i.e. 4 bi-layers). A total of seven optical stacks were deposited, consisting of four high-index stacks alternated with three low-index stacks in the sequence HLHLHLH. The thickness and refractive index of the high index stacks were determined as described above and were roughly 89 nm and 1.86 (at 633 nm), respectively. The thickness and refractive index of the low index stacks were determined as described above and were roughly 80 nm and 1.33 (at 633 nm), respectively. The reflectivity (% R) and transmission (% T) were determined as described above and reported in the following table.

| Example | % R at 525 nm | Average % T (290-400 nm) | Average % R (400-700 nm) | Average % R (700-1200 nm) |
|---|---|---|---|---|
| CE-A | 9.8 | 13.5 | 10.4 | 56.5 |
| EX1 | 65.3 | 14.3 | 38.4 | 59.0 |

The layer-by-layer self-assembled visible reflective coating substantially increases the average reflectivity in the visible range (400-700 nm) compared to the MOF IR mirror film lacking the layer-by-layer self-assembled coating.

Examples 2 (EX2) and Comparative Example B
(CE-B)

CE-B was a sample of the visible and near infrared multilayer optical film, previously described in the specification. EX2 was prepared by depositing an ultraviolet (UV) reflector on the MOF visible and near infrared mirror film substrate using the layer-by-layer self-assembly method described above. The deposited self-assembled layers consisted of high-index stacks of $(TiO_2/PSS)_5$ (i.e. 5 bi-layers) and low-index stacks of $(PDAC/SiO_2)_3$ (i.e. 3 bi-layers). A total of seven optical stacks were deposited, consisting of four high-index stacks and three low-index stacks in the sequence HLHLHLH. The thickness and refractive index of the high index stacks were determined as described above and were roughly 49 nm and 1.84 (at 633 nm), respectively. The thickness and refractive index of the low index stacks were determined as described above and were roughly 45 nm and 1.33 (at 633 nm), respectively. The reflectivity (% R) and transmission (% T) were determined as described above and reported in the following table.

| Example | % R at 325 nm | Average % R (290-400 nm) | Average % R (400-700 nm) | Average % R (700-1200 nm) |
|---|---|---|---|---|
| CE-B | 26.3 | 35.1 | 98.9 | 96.7 |
| EX2 | 60.3 | 51.7 | 98.2 | 96.5 |

The layer-by-layer self-assembled UV reflective coating substantially increases the average reflectivity in the UV range (290-400 nm) compared to the MOF visible and near infrared mirror film lacking the layer-by-layer self-assembled coating.

Example 3

A layer-by-layer self-assembled coating can be deposited on the MOF IR Mirror as described above to provide anti-reflection and anti-fogging properties. The method for making this layer-by-layer self-assembled coating on glass slides and silicon wafers is described by Cebeci et al. Langmuir 2006, 22, 2856-2862. Poly(allylamine hydrochloride) (PAH) (Mw=70,000) and poly(sodium 4-styrene sulfonate) (PSS) (Mw=70,000) can be obtained from Sigma-Aldrich (St. Louis, Mo.) and dissolved in deionized water at a concentration of 0.01 M with respect to the repeat units. A Ludox SM-30 colloidal silica nanoparticle suspension with average particle size of 7 nm can be purchased from Sigma-Aldrich (St. Louis, Mo.) and diluted to 0.03 wt % with deionized water. The pH of the PAH and PSS solutions and the SiO$_2$ suspension can be adjusted to 4.0 with hydrochloric acid (HCl). The MOF can be rinsed with IPA and DI water, dried with nitrogen gas, subjected to air corona using a BD-20AC Laboratory Corona Treater (obtained from Electro-Technic Products, Inc., Chicago, Ill.) for approximately 30 seconds, and then mounted in the substrate holder of a StratoSequence VI dip coater. The layer-by-layer self-assembly process can be carried out as described above to deposit adhesion layers (PAH/PSS)$_4$ (i.e. 4 bi-layers) followed by a low refractive index stack (PAH/SiO$_2$)$_{10}$. (i.e. 10 bi-layers). Dip times of 15 min in the polymer solutions and nanoparticle suspension can be used. Deionized water with no pH adjustment can be used for the rinse steps. The coating can have a thickness between 100 and 150 nm and a refractive index in the range of 1.245-1.270 at 555 nm. The coating can reduce the reflectivity of the MOF IR Mirror in the visible range (400-700 nm). As described in Cebeci et al., different pH conditions may also be used, for example, pH 7.5 for PAH and pH 9.0 for SiO$_2$.

In one embodiment, the MOF IR mirror substrate (CE_A as previously described) was cleaned by rinsing with IPA, then DI water, then drying with a stream of nitrogen gas. The cleaned substrate was then subjected to an air corona using a BD-20AC Laboratory Corona Treater (Electro-Technic Products, Inc., Chicago, Ill.) for approximately 30 seconds to impart a slight negative charge to the substrate surface. The substrate was then mounted in the sample holder of a StratoSequence VI (nanoStrata Inc., Tallahassee, Fla.) dip coating robot. A solution of PAH was prepared by dissolving PAH powder in water to a concentration of 0.01 M with respect to the repeat unit. The solution was stirred for 2 hours and the pH was approximately 4.0 without any adjustment. A suspension of SiO$_2$ nanoparticles (7 nm diameter, sodium stabilized, obtained from Sigma Aldrich, St. Louis, Mo. as a 30 wt % aqueous suspension) was prepared by diluting the 30 wt % suspension to 0.03 wt % and adjusting the pH to approximately 4.0 with HCl. The coating sequence involved first immersing the substrate in the 0.01 M solution of PAH for 5 min, followed by three separate 30 sec rinses in DI water, followed by immersion in the 0.03 wt % solution of SiO$_2$ nanoparticles for 5 min, followed by three separate 30 sec rinses in DI water. The substrate was rotated at about 90 rpm in each bath. A total of 15 bi-layers were deposited to make a coating denoted as (PAH/SiO$_2$)$_{15}$. The thickness and refractive index of an equivalent coating made on a glass slide were measured using the spectroscopic ellipsometry method described above and were found to be roughly 122 nm and 1.26 (at 633 nm), respectively. The reflectivity (% R) was determined as described above and reported in the following table.

| Example | % R at 550 nm | Average % R (290-400 nm) | Average % R (400-700 nm) | Average % R (700-1200 nm) |
| --- | --- | --- | --- | --- |
| CE-A | 7.4 | 61.7 | 8.3 | 59.0 |
| EX3 | 4.0 | 57.5 | 5.3 | 57.4 |

Example 4

A layer-by-layer self-assembled coating can be deposited on an MOF reflective polarizer in the same manner as Example 3 (utilizing one the MOF reflective polarizers described in the specification) to provide anti-reflection and anti-fogging properties.

Example 5

A UV protective hardcoat, such as available from Momentive Performance Materials, Albany, N.Y., under the trade designation "AS4000", can be coated onto a visible and near infrared mirror multilayer optical film, previously described in the specification. An ultraviolet (UV) reflective coating can be deposited onto the UV protective hardcoat using the layer-by-layer self-assembly method as described in Example 2.

In one embodiment, a visible and near infrared reflective multilayer optical film (CE-B), which was previously described in the specification, was rinsed with IPA and dried with nitrogen gas. Next, a solution of SHP470 basecoat (available from Momentive Performance Materials, Albany, N.Y. as a 10 wt % solids solution in 1-methoxy-2-propanol) was coated onto the MOF with a wire wound rod (available from BYK-Gardner GmbH, Germany, Catalog #PA-4116) to give a wet film thickness of about 25 microns. This sample was placed in an oven at 120° C. for 20 min. Next, a solution of AS4700 Hardcoat (available from Momentive Performance Materials, Albany, N.Y. as a 25 wt % solids solution in isopropanol, n-butanol, and methanol) was coated on top of the SHP470 basecoat with the same wire wound rod as above. This sample was placed in an oven at 130° C. for 30 min. EX5 was prepared by depositing a layer-by-layer self-assembled UV reflective coating (as described in Example 2) on top of CE-C. The final construct is a visible and near infrared reflective MOF as the substrate, a UV protective hardcoat as an intermediate layer, and a layer-by-layer self-assembled UV reflector as the outermost layer. The reflectivity (% R) was determined as described above and reported in the following table.

| Example | % R at 325 nm | Average % R (290-400 nm) | Average % R (400-700 nm) | Average % R (700-1200 nm) |
| --- | --- | --- | --- | --- |
| CE-C | 2.7 | 15.0 | 98.4 | 96.7 |
| EX5 | 57.4 | 43.2 | 98.0 | 96.4 |

What is claimed is:

1. A method of making a multilayer optical film comprising:
   providing a multilayer optical film comprising a plurality of alternating polymeric layers of a low refractive index layer and a high refractive index layer, wherein the high refractive index layer comprises a birefringent thermoplastic polymer and the plurality of alternating polymeric layers reflect at least one bandwidth of electromagnetic radiation ranging from ultraviolet to near infrared;
   disposing onto the multilayer optical film a plurality of layers deposited by layer-by-layer self-assembly of nanoparticles, polymers, or a combination thereof,
   wherein the plurality of layers deposited by layer-by-layer self-assembly comprise alternating stacks of low refractive index bi-layers and high refractive index bi-layers, wherein the plurality of bi-layers reflect at least one bandwidth of electromagnetic radiation ranging from ultraviolet to near infrared, wherein the plurality of bi-layers reflect at least a portion of the same bandwidth of electromagnetic radiation as the multilayer optical film, and wherein the plurality of bi-layers reflect at least a portion of a different bandwidth of electromagnetic radiation as the multilayer optical film.

2. The method of claim 1 wherein the plurality of bi-layers reflect at least one bandwidth of electromagnetic radiation ranging from ultraviolet to near infrared.

3. The method of claim 2 wherein the plurality of bi-layers reflect at least a portion of the same bandwidth of electromagnetic radiation as the multilayer optical film.

4. The method of claim 1 wherein the plurality of bi-layers reflect at least a portion of a different bandwidth of electromagnetic radiation as the multilayer optical film.

5. The method of claim 1 wherein the multilayer optical film is an ultraviolet reflector, a blue reflector, a visible reflector, an infrared reflector or a combination thereof.

6. The method of claim 1 wherein the plurality of layers deposited by layer-by-layer self-assembly is an ultraviolet reflector, a blue reflector, a visible reflector, an infrared reflector or a combination thereof.

7. The method of claim 1 wherein the multilayer optical film comprising the plurality of bi-layers has a higher reflectivity than the multilayer optical film alone.

8. The method of claim 1 wherein the plurality of layers deposited by layer-by-layer self-assembly are formed by depositing alternating layers of water-based compositions comprising at least one polyelectrolyte and inorganic oxide nanoparticles.

9. The method of claim 1 wherein the low refractive index bi-layers comprise silica, alumina, mixed metal oxides thereof, and mixtures thereof.

10. The method of claim 1 wherein the high refractive index bi-layers comprise titania, zirconia, alumina, antimony oxide, ceria, zinc oxide, lanthanum oxide, tantalum oxide, mixed metal oxides thereof, and mixtures thereof.

11. The method of claim 9 wherein the multilayer optical film comprises 0 to 5 wt.-% of inorganic oxide nanoparticles.

12. The method of claim 1 wherein the high and low refractive index layers of the multilayer optical film comprise alternating ¼ wave layers.

13. The method of claim 1 wherein the plurality of bi-layers comprise alternating ¼ wave stacks.

14. The method of claim 1 wherein the plurality of layers deposited by layer-by-layer self-assembly reduce the surface reflections at 550 nm of the multilayer optical film to less than 2%.

15. The method of claim 1 wherein the plurality of layers deposited by layer-by-layer self-assembly comprise alternating layers of polyelectrolyte and silica.

16. The method of claim 15 wherein the plurality of layers deposited by layer-by-layer self-assembly provide a durable top coat.

17. An optical film comprising:
a multilayer optical film comprising a plurality of alternating polymeric layers of a low refractive index layer and a high refractive index layer, wherein the high refractive index layer comprises a birefringent thermoplastic polymer and the plurality of alternating polymeric materials reflects at least one bandwidth of electromagnetic radiation ranging from ultraviolet to near infrared; and
a plurality of layers disposed onto the multilayer optical film, wherein the plurality of layers comprises layer-by-layer self-assembled nanoparticles, polymers, or a combination thereof,
wherein the multilayer optical film comprises polyethylenenaphthalate and the plurality of layers deposited by layer-by-layer self-assembly prevent the polyethylenenaphthalate from degrading from exposure to blue light having a wavelength in a range of 400 to 490 nm.

18. An optical display, architectural film, greenhouse film, window film, car wrap film, paint protection film, traffic signage film, commercial graphics film, daylighting film, solar photovoltaic front-sheet film, or solar power concentrating mirror comprising an optical film according to claim 17.

19. The optical film of claim 18 wherein the plurality of layers comprise at least 30 wt.-% of inorganic oxide nanoparticles.

20. The method of claim 1 wherein the plurality of layers deposited by layer-by-layer self-assembly comprise at least 30 wt.-% of inorganic oxide nanoparticles.

21. The method of claim 1 wherein the multilayer optical film comprises polyethylenenaphthalate and the plurality of layers deposited by layer-by-layer self-assembly prevent the polyethylenenaphthalate from degrading from exposure to blue light having a wavelength in a range of 400 to 490 nm.

22. An optical film comprising:
a multilayer optical film comprising a plurality of alternating polymeric layers of a low refractive index layer and a high refractive index layer, wherein the high refractive index layer comprises a birefringent thermoplastic polymer and the plurality of alternating polymeric materials reflects at least one bandwidth of electromagnetic radiation ranging from ultraviolet to near infrared; and a plurality of layers disposed onto the multilayer optical film, wherein the plurality of layers comprises layer-by-layer self-assembled nanoparticles, polymers, or a combination thereof,
wherein the plurality of layers comprise alternating stacks of low refractive index bi-layers and high refractive index bi-layers, wherein the plurality of bi-layers reflect at least one bandwidth of electromagnetic radiation ranging from ultraviolet to near infrared, wherein the plurality of bi-layers reflect at least a portion of the same bandwidth of electromagnetic radiation as the multilayer optical film, and wherein the plurality of bi-layers reflect at least a portion of a different bandwidth of electromagnetic radiation as the multilayer optical film.

* * * * *

UNITED STATES PATENT AND TRADEMARK OFFICE
CERTIFICATE OF CORRECTION

PATENT NO. : 9,829,604 B2  
APPLICATION NO. : 14/435186  
DATED : November 28, 2017  
INVENTOR(S) : Schmidt et al.

Page 1 of 1

It is certified that error appears in the above-identified patent and that said Letters Patent is hereby corrected as shown below:

In the Specification

Column 14
Line 5, delete "57 5" and insert -- 57.5 --, therefor.

Column 19
Line 21, after "properties" insert -- . --.

In the Claims

Column 30
Line 20, in Claim 19, delete "claim 18" and insert -- claim 17 --, therefor.

Signed and Sealed this
Third Day of July, 2018

Andrei Iancu
*Director of the United States Patent and Trademark Office*